United States Patent
Kawata

(10) Patent No.: US 6,912,020 B2
(45) Date of Patent: Jun. 28, 2005

(54) ELECTRO-OPTICAL APPARATUS, ELECTRONIC DEVICE, SUBSTRATE FOR USE IN AN ELECTRO-OPTICAL APPARATUS, METHOD OF PRODUCING A SUBSTRATE FOR USE IN AN ELECTRO-OPTICAL APPARATUS, AND LIGHT SHIELDING FILM

(75) Inventor: Hidenori Kawata, Chino (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 09/922,859

(22) Filed: Aug. 7, 2001

(65) Prior Publication Data

US 2002/0036818 A1 Mar. 28, 2002

(30) Foreign Application Priority Data

| Aug. 7, 2000 | (JP) | ...................................... 2000-238699 |
| Jun. 18, 2001 | (JP) | ...................................... 2001-183863 |

(51) Int. Cl.[7] .................. G02F 1/136; G02F 1/1333; G02F 1/1335

(52) U.S. Cl. .................. 349/44; 349/110; 349/5; 349/6

(58) Field of Search .................. 349/44, 5, 6, 110; 359/245; 257/59

(56) References Cited

U.S. PATENT DOCUMENTS

| 5,282,068 | A | * | 1/1994 | Inaba ........................... 359/54 |
| 5,510,916 | A | | 4/1996 | Takahashi |
| 5,686,980 | A | | 11/1997 | Hirayama et al. |
| 5,821,622 | A | * | 10/1998 | Tsuji et al. .................. 257/763 |
| 5,999,236 | A | | 12/1999 | Nakajima et al. |
| 6,521,913 | B1 | * | 2/2003 | Murade ........................ 257/59 |
| 6,545,359 | B1 | * | 4/2003 | Ohtani et al. ................ 257/758 |
| 2001/0040656 | A1 | * | 11/2001 | Na et al. ..................... 349/110 |
| 2002/0018164 | A1 | * | 2/2002 | Ko et al ..................... 349/129 |
| 2003/0011740 | A1 | * | 1/2003 | Tanaka et al. |

FOREIGN PATENT DOCUMENTS

| JP | 63274929 | * | 11/1988 | .................. 349/11 |
| JP | 04001728 | * | 1/1992 | .................. 349/132 |
| JP | A-6-224396 | | 8/1994 | |
| JP | 06-224396 | * | 8/1994 | .......... H01L/27/14 |
| JP | A-6-250163 | | 9/1994 | |
| JP | 06-250163 | * | 9/1994 | ......... G02F/1/1335 |
| JP | 9-311326 | * | 12/1997 | ......... G02F/1/1335 |
| JP | 10-206889 A | | 8/1998 | |
| JP | A-11-84422 | | 3/1999 | |
| JP | A-11-95687 | | 4/1999 | |
| JP | A-11-119007 | | 4/1999 | |
| JP | 11-119007 | * | 4/1999 | ............ G02B/5/00 |
| JP | A-11-209884 | | 8/1999 | |
| JP | 11-209884 | * | 8/1999 | ............. C23F/1/28 |
| JP | A-2002-122857 | | 4/2002 | |
| JP | 2002-122857 | * | 4/2002 | ......... G02F/1/1335 |
| KR | 1995-27473 A | | 10/1995 | |
| KR | 1998-031802 | | 7/1998 | |

* cited by examiner

*Primary Examiner*—Robert H. Kim
*Assistant Examiner*—Mike Qi
(74) *Attorney, Agent, or Firm*—Oliff & Berridge, PLC

(57) ABSTRACT

The invention provides a light shielding film having excellent capability of shielding light. The light shielding film includes a barrier layer formed of a material selected from the group including a refractory nitride compound, silicon compound, tungsten compound, tungsten, and silicon, and also includes a metal layer formed of a material selected from the group including a metal in the form of a simple substance or a metal compound, whose high capability of shielding light is degraded when being oxidized.

10 Claims, 9 Drawing Sheets

ELECTRO-OPTICAL APPARATUS, ELECTRONIC DEVICE, SUBSTRATE FOR USE IN AN ELECTRO-OPTICAL APPARATUS, METHOD OF PRODUCING A SUBSTRATE FOR USE IN AN ELECTRO-OPTICAL APPARATUS, AND LIGHT SHIELDING FILM

BACKGROUND OF THE INVENTION

1. Field of Invention

The present invention relates to an electro-optical apparatus, an electronic device, a substrate for use in an electro-optical apparatus, a method of producing a substrate for use in an electro-optical apparatus, and a light shielding film. More particularly, the present invention relates to a structure of a light shielding film having excellent light shielding performance which is advantageous for use in a projection-type liquid crystal display.

2. Description of Related Art

FIG. 15 is a cross-sectional view illustrating an example of a liquid crystal device. This liquid crystal device is formed of two transparent substrates made of glass, quartz or the like and a liquid crystal sealed between the two substrates, wherein one of the two substrates is a thin film transistor (hereinafter referred to as "TFT") array substrate 10, and the other substrate is an opposite substrate 20 disposed at an opposing location.

A plurality of pixel electrodes 9a and pixel switching TFTs 30 for controlling the respective pixel electrodes 9a are formed in the shape of a matrix on the TFT array substrate 10, and the source region id of each TFT 30 is electrically connected via a contact hole 5 to a data line 6a for supplying an image signal. The gate of each TFT 30 is electrically connected to a scanning line 3a so that scanning signals, in the form of pulses, are supplied over the scanning line 3a in accordance with predetermined timing. The pixel electrode 9a is electrically connected to the drain region 1e of the pixel switching TFT 30 via a contact hole 8, so that when the pixel switching TFT 30, serving as a switching element, is closed for a predetermined period of time, image signals supplied via the data line 6a are written into the pixel.

The image signals with particular signal levels are applied to a liquid crystal via the respective pixel electrodes 9a, and the image signals are retained between the pixel electrodes 9a and an opposite electrode 21 formed on the opposite substrate 20 over a predetermined period of time. In general, in order to prevent leakage of the image signals, a storage capacitor is added in parallel to liquid crystal capacitance formed between the pixel electrode 9a and the opposite electrode 21. Herein, the storage capacitor is formed using a capacitor line 3b, which is an interconnection line provided for formation of the storage capacitor. Furthermore, an alignment film 16 that is subjected to an alignment treatment, such as rubbing, is disposed on the pixel electrode 9a.

As shown in FIG. 15, a first light shielding film 11a that is formed of WSi (tungsten silicide) is disposed at a location corresponding to each pixel switching TFT 30 on the surface of the TFT array substrate 10.

This first light shielding film 11a prevents light returning from the TFT array substrate 10 from being incident upon the channel region 1a' or the LDD region 1b or 1c of the pixel switching TFT 30.

A first interlayer insulating film (insulator layer) 12 for electrically isolating the semiconductor layer 1a from the first light shielding film 11a is disposed between the first light shielding film 11a and the pixel switching TFT 30. A second interlayer insulating film 4 is formed on the TFT array substrate 10, such that the scanning lines 3a and the insulating layer 2 are also covered with the interlayer insulating film 4, wherein the interlayer insulating film 4 has a contact hole 5 formed therethrough so as to reach the heavily doped source region id, and also has a contact hole 8 formed therethrough so as to reach the heavily doped drain region 1e. Furthermore, a third interlayer insulating film 7, having a contact hole 8 for connection to the heavily doped drain region 1e, is formed on the data line 6a and the second interlayer insulating film 4.

In this liquid crystal device, a storage capacitor 70 is formed by extending the insulating thin film 2 from a location under the scanning line 3a so that the extended part of the insulating thin film 2 serves as a dielectric film, and extending the semiconductor film 1a so that the extended part of the semiconductor film 1a serves as a first storage capacitor electrode 1f, and furthermore employing, as a second storage capacitor electrode, a part of the capacitor line 3b at a location corresponding to the first storage capacitor electrode if and the dielectric film.

On the other hand, an opposite electrode (common electrode) 21 is disposed over the entire surface of the opposite substrate 20, and, furthermore, an alignment film 22 subjected to an alignment treatment, such as rubbing, is disposed on the opposite electrode 21. Furthermore, in each pixel on the opposite substrate 20, a second light shielding film 23 is disposed in an area other than the display area. The second light shielding film 23 is also referred to as a black matrix and serves to prevent light incident on the side of the opposite substrate 20 from intruding into the channel region 1a', the source region 1b or 1d, or the drain region 1c or 1e of the semiconductor layer 1a of the pixel switching TFT 30.

A liquid crystal is sealed in a space between the TFT array substrate 10 and the opposite substrate 20, which are constructed in the above-described manner and disposed such that the pixel electrodes 9a and the opposite electrode 21 face each other, thereby forming a liquid crystal layer 50 therein.

SUMMARY OF THE INVENTION

In the liquid crystal device using the first light shielding film 11 formed of WSi, it is desirable that the light shielding film have an excellent ability to block light.

One problem in the liquid crystal device that includes switching elements is that an undesirable photocurrent is generated in the switching elements by return light, and thus degradation occurs in certain characteristics, such as the switching performance of the switching elements. In particular, when such a liquid crystal device is used in an apparatus including a high-intensity light source, such as a projector, the problem of undesirable photocurrent caused by return light is significant.

In order to avoid the above problem, it has been proposed that Ti (titanium), which is a material having a good characteristic in terms of its ability to block light, is used to form the first light shielding film 11a. However, after forming the first light shielding film 11a, if heat treatment is performed at a temperature higher than 500° C. to form an insulating film or for the purpose of annealing during the process of forming the switching elements, Ti of the first light shielding film 11a chemically reacts with an insulating film containing oxygen, such as SiO2, in contact with Ti. As a result of the chemical reaction, an oxide film is formed. The formation of the oxide film results in degradation in the ability of Ti to block light. Thus, use of Ti does not always result in good performance in terms of its ability to block light.

In view of the problems described above, it is an object of the present invention to provide a light shielding film having an excellent light shielding performance.

It is another object of the present invention to provide a substrate having a high-performance light shielding film for use in an electro-optical apparatus, and a method of producing such a substrate. It is still another object of the present invention to provide an electro-optical apparatus and an electronic device.

To achieve the above objects, the invention provides an electro-optical apparatus including a pair of substrates between which an electro-optical material is disposed; a switching element disposed on one of the substrates; and a light shielding film disposed at a location opposing the switching element. The light shielding film includes a metal layer formed of a refractory metal in the form of a simple substance or a refractory metal compound; and a barrier layer disposed on at least one of surfaces of the metal layer, the barrier layer being formed of a refractory metal or a refractory metal compound containing no oxygen.

In this electro-optical apparatus, even if a high-temperature heat treatment is performed after forming the light shielding film, oxidation of the metal layer of the light shielding film is suppressed by the barrier layer, which is formed of a refractory metal or a refractory metal compound containing no oxygen, on the surface in contact with the insulating film containing oxygen such as SiO2, and thus the light shielding film can maintain good light shielding performance.

This makes it possible to reduce the thickness of the light shielding film compared with the conventional light shielding film, which in the form of a single layer of WSi. As a result, the difference in surface level caused by the irregularity of surface topography is minimized between the area in which the light shielding film is formed and the area in which the light shielding film is not formed.

In this electro-optical apparatus according to the present invention, the light shielding film is disposed between the one of the substrates and the switching element, and the barrier layer of the light shielding layer is disposed on a side facing the switching element.

In accordance with this structure, when a high-temperature heat treatment is performed after forming an insulating film on the barrier layer, the metal layer is prevented from being oxidized, and thus a reduction in transmittance can be prevented.

In the electro-optical apparatus according to the present invention, the light shielding film may be disposed on the switching element, such that the light shielding film faces the electro-optical material.

In accordance with this structure, the switching element is prevented from being exposed to illumination of light coming through one of the substrates.

In the electro-optical apparatus according to the present invention, the metal layer of the light shielding film may include a light shielding metal layer and a light-absorbable metal layer. The light-absorbable metal layer is disposed on a side facing the switching element.

In accordance with this structure, the light shielding metal layer prevents the switching element from being illuminated with light, and the light-absorbable metal layer disposed on the side facing the switching element absorbs light and thus prevents the light from being internally reflected.

In the electro-optical apparatus according to the present invention, the metal layer may be disposed between the barrier layers.

In this electro-optical apparatus, when a heat treatment is performed at a high temperature during the process of producing the electro-optical apparatus, the barrier layer prevents the metal layer from being oxidized and thus the metal layer can maintain its capability of shielding light.

In the electro-optical apparatus according to the present invention, the other substrate may include a light shielding film formed thereon. The light shielding film defines a display area and includes a metal layer which is formed of a refractory metal in the form of a simple substance or a refractory metal compound, and also includes a barrier layer which is formed of a refractory metal in the form of a simple substance or a refractory metal compound containing no oxygen and which is disposed on at least one of the surfaces of the metal layer.

This structure allows a further improvement in the capability of shielding light coming from the other substrate.

In this electro-optical apparatus according to the present invention, the light shielding film may be connected to a fixed potential.

In accordance with this structure, the light shielding film is maintained at the fixed potential and thus it is possible to prevent noise from intruding into the switching element.

In the electro-optical apparatus according to the present invention, the barrier layer is preferably formed of a material selected from the group including a nitride compound, a silicon compound, a tungsten compound, tungsten, and silicon.

In the electro-optical apparatus according to the present invention, the barrier layer is preferably formed of WSi.

In the electro-optical apparatus according to the present invention, the metal layer is preferably formed of Ti.

In the electro-optical apparatus according to the present invention, the barrier layer may be formed on the upper and lower surfaces of the metal layer such that the thickness of the barrier layer formed on the upper surface is greater than that on the lower surface.

This structure makes it possible to prevent the metal layer from being oxidized when an insulating film is formed on the upper barrier layer and a heat treatment is performed at a high temperature, without necessitating a significant increase in the thickness of the light shielding film.

Preferably, the thickness of the metal layer is selected within the range from 30 nm to 50 nm, the thickness of the upper barrier layer is selected within the range from 30 nm to 100 nm, and the thickness of the lower barrier layer is selected within the range from 10 nm to 20 nm.

The electro-optical apparatus according to the present invention may be used in an electronic device.

This makes it possible for the electronic device to use a high-intensity light source without causing generation of an undesirable photocurrent.

The present invention provides a substrate including a light shielding film disposed on an insulating substrate, for use in an electro-optical apparatus. The light shielding film includes a metal layer formed of a refractory metal in the form of a simple substance or a refractory metal compound; and a barrier layer disposed on at least one of surfaces of the metal layer, the barrier layer being formed of a refractory metal or a refractory metal compound containing no oxygen.

In accordance with this structure, when a heat treatment is performed at a high temperature after forming the light shielding film, the metal layer of the light shielding film is prevented from being oxidized by the barrier layer which is formed on the side in contact with an insulating film, such as SiO2 containing oxygen, using the refractory metal or the refractory metal compound containing no oxygen, thereby ensuring that the light shielding film has high capability of shielding light.

The present invention provides a method of producing a substrate including a light shielding film formed on an insulating substrate, for use in an electro-optical apparatus. The method includes the steps of: forming a metal layer by depositing a film of a refractory metal in the form of a simple substance or a film of a refractory metal compound upon the insulating substrate; forming a barrier layer by depositing a film of a refractory metal or a refractory metal compound containing no oxygen upon the metal layer; and forming an insulating film by depositing an insulating material upon the barrier layer.

In this method, when a heat treatment is performed at a high temperature after forming the light shielding film, the metal layer of the light shielding film is prevented from being oxidized by the barrier layer which is formed, on the side in contact with an insulating film such as SiO2 containing oxygen, using the refractory metal or the refractory metal compound containing no oxygen.

This method makes it possible to form the light shielding film so as to have a smaller thickness than the thickness of the conventional light shielding film using WSi. This makes it possible to form the pattern of the light shielding film in a shorter etching time than is required to form the conventional light shielding film. Furthermore, it becomes possible to increase the life of a sputtering target and to reduce the amount of gas used to form the light shielding film.

The method of producing a substrate for use in an electro-optical apparatus, according to the present invention, may further include the step of, before forming the metal layer, forming a barrier layer by depositing a film of a refractory metal or a refractory metal compound containing no oxygen upon the metal layer.

In this method, when a heat treatment is performed at a high temperature, the barrier layer prevents the metal layer from being oxidized, and thus the metal layer can maintain its capability of shielding light.

In the method of producing a substrate for use in an electro-optical apparatus, according to the present invention, the step of forming the insulating film may include the step of performing a heat treatment at a temperature in the range from 500° C. to 1100° C.

This method makes it possible to form the insulating film having a low etching rate without causing degradation of the ability of the light shielding film to block light.

The present invention provides a light shielding film that includes a metal layer formed of a refractory metal in the form of a simple substance or a refractory metal compound; and a barrier layer disposed on at least one of surfaces of the metal layer, the barrier layer being formed of a refractory metal or a refractory metal compound containing no oxygen.

In this light shielding film, when a heat treatment is performed at a high temperature after forming the light shielding film, the metal layer of the light shielding film is prevented from being oxidized by the barrier layer which is formed, on the side in contact with an insulating film such as SiO2 containing oxygen, using the refractory metal or the refractory metal compound containing no oxygen, thereby ensuring that the light shielding film has high capability of shielding light.

Furthermore, this light shielding film can be formed so as to have a smaller thickness than the thickness of the conventional light shielding film using WSi. This makes it possible to form the pattern of the light shielding film in a shorter etching time than is required to form the conventional light shielding film. Furthermore, it becomes possible to increase the life of a sputtering target and to reduce the amount of gas used to form the light shielding film.

In the light shielding film according to the present invention, the barrier layer is preferably formed of a material selected from the group including a nitride compound, a silicon compound, a tungsten compound, tungsten, and silicon.

In the light shielding film according to the present invention, the barrier layer may be formed of a nitride compound selected from the group including SiN, TiN, WN, MoN, and CrN.

In the light shielding film according to the present invention, the barrier layer may be formed of a silicon compound selected from the group including TiSi, WSi, MoSi, CoSi, and CrSi.

In the light shielding film according to the present invention, the barrier layer may be formed of a tungsten compound selected from the group including TiW and MoW.

In the light shielding film according to the present invention, by forming the barrier layer using a material selected from the group including a refractory nitride compound, silicon compound, and tungsten compound, it becomes possible to more effectively protect the material of the metal layer from oxidation caused by a reaction with an insulating film in contact with the light shielding film, thereby more effectively suppressing the degradation in the light shielding performance of the light shielding film during the high-temperature heat treatment.

In the light shielding film according to the present invention, the metal layer may be formed of a simple substance of metal selected from the group including Ti, W, Mo, Co, Cr, Hf, and Ru.

In the light shielding film according to the present invention, the metal layer may be formed of a metal compound selected from the group including TiN, TiW, and MoW.

In this light shielding film according to the present invention, the use of a preferable material selected from the group including metals or metal oxides described above makes it possible to further improve the light shielding ability of the light shielding film.

In the light shielding film according to the present invention, the thickness of the barrier layer is preferably selected within the range from 1 to 200 nm.

This sufficiently prevents the light shielding film from being degraded in terms of the capability of shielding light during the high-temperature heat treatment. In particular, when the thickness of the barrier layer is selected to be less than 150 nm, it is possible to provide a high-quality light shielding film which does not cause its substrate to be bent significantly. In the case where undoped polysilicon is employed, the barrier layer makes it less likely that the substrate will warp significantly even when the thickness is greater than 150 nm.

In the light shielding film according to the present invention, the thickness of the metal layer is selected within the range from 10 to 200 nm.

This makes it possible to provide a light shielding film having a small thickness. In particular, when the light shielding film is used in a liquid crystal device, the height of steps on the surface of the alignment film created by the presence of the light shielding film can be minimized, and thus alignment failures of the liquid crystal can be suppressed.

In the light shielding film according to the present invention, the barrier layers may be formed on both surfaces of the metal layer into a multilayer structure.

That is, this light shielding film according to the present invention is provided such that the barrier layers are formed on both surfaces of the metal layer into the multilayer structure.

By forming the light shielding film in such a fashion, it becomes possible to protect both surfaces of the metal layer by the barrier layers, thereby ensuring that the material of the metal layer is prevented from being oxidized in a more effective manner, and thus ensuring that the light shielding film does not encounter significant degradation in the light shielding ability during the high-temperature heat treatment.

In the light shielding film according to the present invention, the metal layer may include a light-reflective metal layer and a light-absorbable metal layer.

By forming the light shielding film in the above-described manner, it becomes possible for the resultant light shielding film to have capabilities of reflecting and absorbing light.

In the light shielding film according to the present invention, the light-absorbable metal layer may be formed of a nitride compound.

In the light shielding film according to the present invention, the metal layer may include a light-shielding metal layer and light-absorbable metal layers disposed on two respective opposing surfaces of the light-shielding metal layer.

The present invention also provides a light shielding film that includes a metal layer formed of a refractory metal in the form of a simple substance or a refractory metal compound; and a protection layer formed of a refractory metal or a refractory metal compound which is disposed on at least one of surfaces of the metal layer so as to protect the metal layer from oxidation.

DETAILED DESCRIPTION OF PREFERRED EMBODIMENTS

A first embodiment of the present invention is described below with reference to FIGS. 1 to 3.

In this first embodiment described below, a light shielding film according to the present invention is disclosed. The light shielding film is formed on a substrate for use in an electro-optical apparatus. In particular, in this embodiment, the light shielding film is applied to a liquid crystal device as an example of an electro-optical apparatus.

Figure 1:
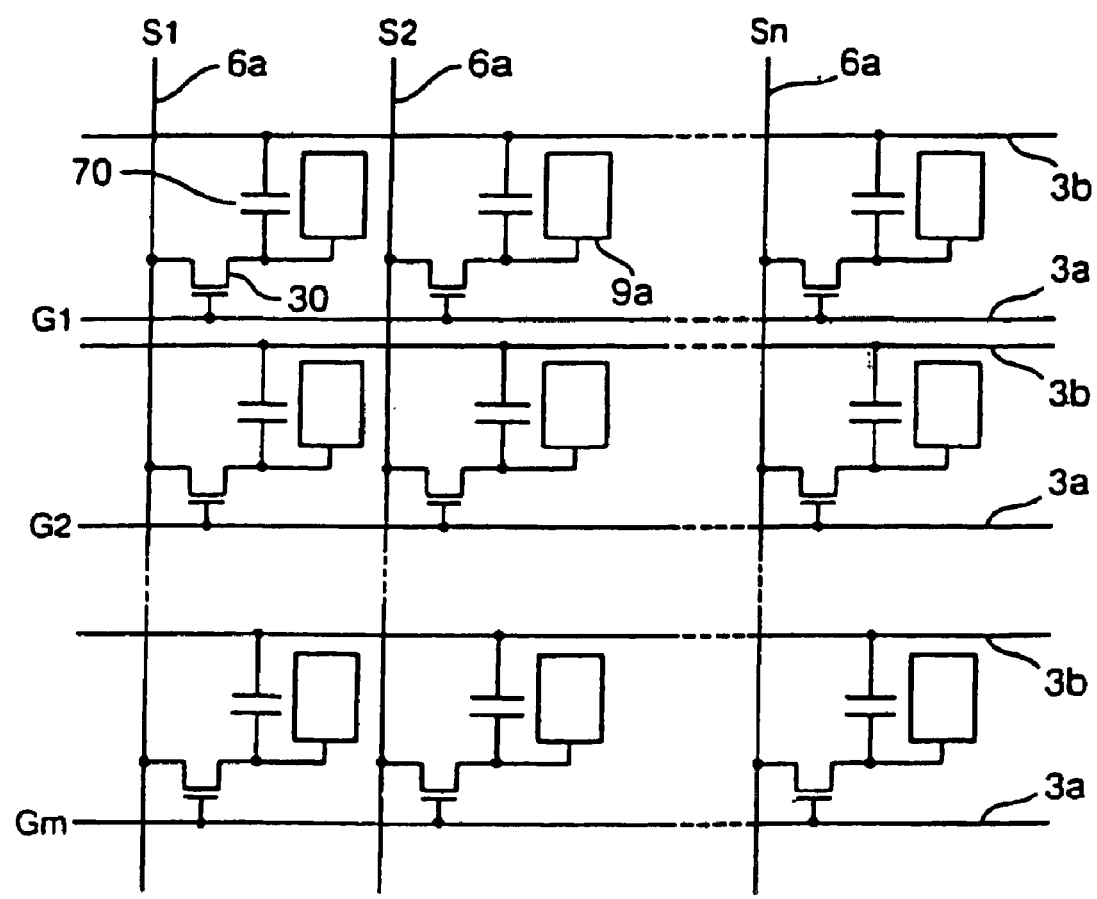
FIG. 1 is a circuit diagram of interconnections and various elements of pixels disposed in the form of an array in an image display area of a liquid crystal device according to an embodiment.

FIG. 1 is a circuit diagram of interconnections and various elements of pixels disposed in the form of an array in an image display area (pixel area) of the liquid crystal device. FIG. 2 is an enlarged plan view illustrating a plurality of adjacent pixels on a TFT array substrate on which data lines, scanning liens, pixel electrodes, a light shielding film, and other elements are formed. FIG. 3 is a cross-sectional view taken along plane A–A' of FIG. 2. In FIG. 3, in order to provide a more easily understandable view, the respective layers and members are displayed in different magnification ratios.

In FIG. 1, in the image displaying area (pixel area) of the liquid display device of the present embodiment, a plurality of pixels disposed in the form of a matrix are provided. Each pixel includes a pixel electrode 9a and a TFT (transistor) 30 that controls the pixel electrode 9a. A data line 6a that supplies an image signal is electrically connected to the source of the TFT 30. Image signals S1, S2, ..., Sn may be supplied over the data lines 6a in a line-by-line fashion in the order of S1, S2, ..., Sn, or may be supplied in a group-by-group fashion. Each group includes a plurality of adjacent data lines 6a. The gate of each TFT 30 is electrically connected to a scanning line 3a. Scanning signals are applied to the scanning lines 3a with predetermined timing on a line-by-line basis in the order G1, G2, ..., Gm. The drains of the respective TFT 30s are electrically connected to corresponding pixel electrodes 9a so that when the TFTs 30 serving as switching elements are closed for a predetermined period with predetermined timings, the image signals S1, S2, ..., Sn supplied via the data lines 6a are applied to the pixel electrodes 9a.

The image signals S , S2, ..., Sn with particular signal levels are applied to a liquid crystal via the respective pixel electrodes 9a, and the image signals are retained between the pixel electrodes 9a and corresponding opposite electrodes (which will be described below) formed on an opposite substrate (which will be described below) over a predetermined period of time. The orientation of molecules of the liquid crystal changes depending upon the level of the applied voltage, and thus light is modulated so that an image with various intensity levels is displayed, which makes it possible to display gray scale images. In the case of a normally white mode, the amount of light passing through the liquid crystal decreases in accordance with applied voltage. On the other hand, in the case of a normally black mode, the amount of light passing through the liquid crystal increases in accordance with applied voltage. In any case, as a whole, light having contrast corresponding to an image signal is output from the liquid crystal device. In order to prevent leakage of the image signals, a storage capacitor 70 is added in parallel to liquid crystal capacitance formed between the pixel electrode 9a and the opposite electrode. The voltage applied to each pixel electrode 9a is retained in the corresponding storage capacitor 70 for a period of time which is, for example, three orders of magnitude longer than the period of time during which the source voltage is applied. This provides for a further enhancement in the data retentivity and it becomes possible to realize a liquid crystal device having a high contrast ratio. In particular, in the present embodiment, the storage capacitor 70 is formed using a low-resistance capacitor line 3b obtained formed of the same layer as the scanning line as will be described later or formed of a light shielding film having electrical conductivity.

The planar structure of the pixel area (image display area) of the TFT array substrate is described in detail with reference to FIG. 2. As shown in FIG. 2, a plurality of transparent pixel electrodes 9a (whose outline is represented by broken lines 9a') are disposed in the form of a matrix in a pixel area on a TFT array substrate of the liquid crystal device, and data lines 6a, scanning lines 3a, and capacitor lines 3b are disposed along the vertical and horizontal boundaries between adjacent pixel electrodes 9a. A source region of a semiconductor layer 1a, formed of monocrystalline silicon, is electrically connected to a data line 6a via a contact hole 5, a drain region of the semiconductor layer 1a is electrically connected to a pixel electrode 9a via a contact hole 8. The scanning lines 3a are disposed at locations corresponding to channel regions (hatched with lines diagonal from upper left to lower right in the figure) of the semiconductor layer 1a so that the scanning lines 3a also serve as gate electrodes.

Each capacitor line 3b includes a main part extending in the form of a straight line along a corresponding scanning line 3a (that is, a first part extending along the corresponding scanning line 3a in the plan view) and also includes a branch extending toward a previous stage (in an upward direction in the figure) along a data line 6a from a location at which the main part crosses the data line 6a (that is, a second part extending along the data line 6a in the plan view).

Furthermore, a plurality of first light shielding films 111 are formed in an area hatched with diagonal lines extending to upper right in the figure. More specifically, each first light shielding film 111 is formed such that a corresponding TFT, including a channel region of a semiconductor layer 1a in the pixel area, is covered with the first light shielding film 111 when viewed from the side of the TFT array substrate, and each first light shielding film 111 includes a main part in the form of a straight light extending in opposition to the main part of the capacitor line 3b and along a corresponding scanning line 3a and also includes a branch extending toward an adjacent following stage (in a downward direction in the figure) along a corresponding data line 6a from a location at which the main part crosses the data line 6a. The end of the downwardly extending branch of the first light shielding film 111 in each stage (pixel line) overlaps, below the data line 6a, with the end of the upwardly extending branch of the capacitor line 3b in the following stage. In this overlapped part, a contact hole 13 is formed to electrically connect the first light shielding film 111 and the capacitor line 3b with each other. That is, in the present embodiment, the first light shielding film 111 is electrically connected via a contact hole 13 to the capacitor line 3b maintained at a fixed potential in a preceding or following stage.

In the present embodiment, the first light shielding film 111 is formed not only in the pixel area but also in areas (peripheral areas) which are outside of the pixel area and in which shielding of light is not necessary, such as a sealing area that is coated with a sealing material for adhesively bonding the opposite electrode substrate, and a terminal pad area in which terminals for connections of input/output signal lines are formed. The light shielding film 111, in the areas outside the pixel area, is also formed in a two-dimensional fashion similar to that in the pixel area. As a result, both the pixel area and the peripheral areas outside the pixel area become similar to each other in terms of the irregularity of surface topography. This makes it possible to uniformly planarize an insulating layer formed on the first light shielding film 111 by polishing, thereby making it possible to adhesively bond the monocrystalline silicon layer in a desirable fashion.

Figure 9:
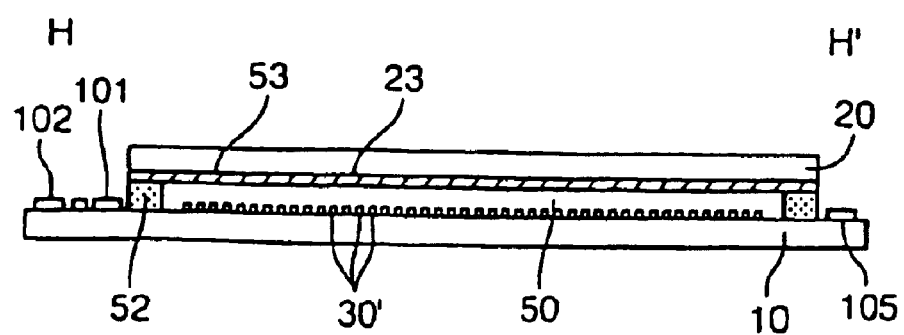
FIG. 9 is a cross-sectional view taken along plane H–H' of FIG. 8.

The cross-sectional structure of the pixel area of the liquid crystal device is described below with reference to FIG. 9. As shown in FIG. 9, the liquid crystal device includes the TFT array substrate 10, serving as an example of a transparent substrate, and also includes the opposite substrate 20 disposed at a location opposing the TFT array substrate 10. The TFT array substrate 10 is made of, for example, a quartz substrate or hard glass, and the opposite substrate 20 is made of, for example, a glass substrate or a quartz substrate. The TFT array substrate 10 includes the pixel electrodes 9a formed thereon, and an alignment film 16 which has been subjected to an alignment treatment such as rubbing is disposed on the pixel electrodes 9a. The pixel electrodes 9a are made of a transparent conducting film, such as an ITO (indium tin oxide) film. The alignment film 16 may be formed of an organic film, such as a polyimide film.

On the other hand, an opposite electrode (common electrode) 21 is disposed over the entire surface of the opposite substrate 20, and, furthermore, an alignment film 22 subjected to an alignment treatment such as rubbing is disposed on the opposite electrode 21. The opposite electrode 21 may be made of a transparent conductive film, such as an ITO film. The alignment film 22 may be formed of an organic film, such as a polyimide film.

On the TFT array substrate 10, as shown in FIG. 9, pixel switching TFTs 30 that switch the pixel electrodes 9a are disposed at locations adjacent to the respective pixel electrodes 9a.

Furthermore, as shown in FIG. 9, on the opposite substrate 20, a second light shielding film 23 is formed in an area in each pixel other than the opening area. The second light shielding film 23 serves to prevent light incident on the side of the opposite substrate 20 from intruding into the channel region 1a or the LDD (Lightly Doped Drain) region 1b or 1c of the semiconductor layer 1a of the pixel switching TFTs 30. The second light shielding film 23 also serves to enhance the contrast and prevent different colorants from being mixed.

Between the TFT array substrate 10 and the opposite substrate 20 which are constructed in the above-described manner and disposed such that the pixel electrodes 9a and the opposite electrode 21 face each other, a liquid crystal is sealed in a space enclosed by a sealing material 52 so as to form a liquid crystal layer 50. When no electric field is applied to the liquid crystal layer 50 by the pixel electrodes 9a, the liquid crystal layer 50 is oriented in a particular direction by the alignment films 16 and 22. The liquid crystal layer 50 may include, for example, one type of nematic liquid crystal or a mixture of two or more types of nematic liquid crystals. The sealing material is an adhesive, such as a photosetting or thermosetting resin, that adhesively bonds two substrates 10 and 20 with each other along their perimeters. The sealing material 52 contains spacers such as glass fibers or glass beads for spacing the two substrates a predetermined distance apart from each other.

Figure 3:
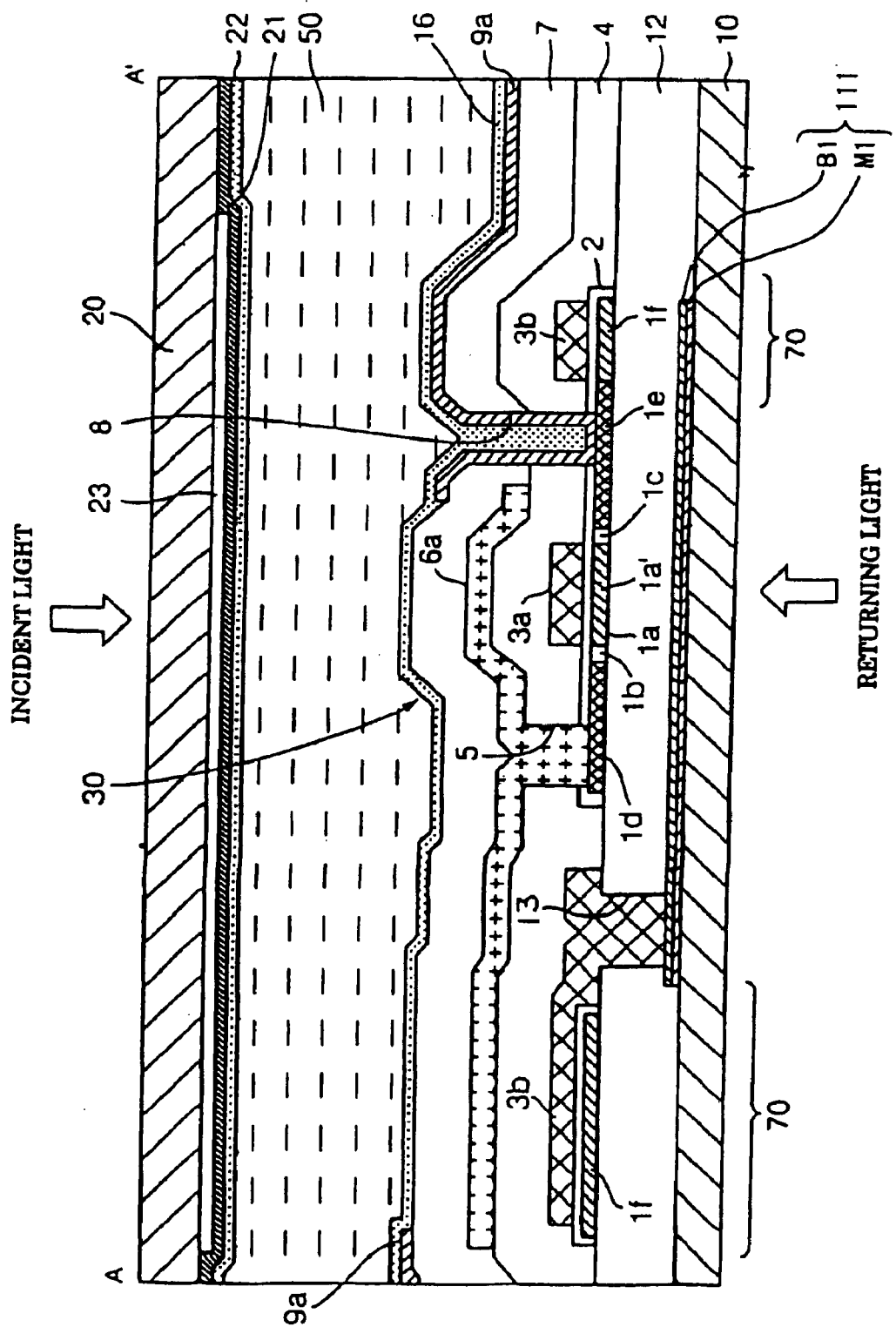
FIG. 3 is a cross-sectional view taken along plane A–A' of FIG. 2.

On the surface of the TFT array substrate 10, as shown in FIG. 3, the first light shielding film 111 is disposed at locations corresponding to the respective pixel switching TFTs 30. The first light shielding film 111 includes a metal layer M1 formed on the TFT array substrate 10 and a barrier layer B1 formed on the metal layer M1.

The barrier layer B1 is formed of a refractory metal or a refractory metal compound containing no oxygen. More specifically, the barrier layer B1 is formed of a material selected from the group including of nitride compounds, silicon compounds, tungsten compounds, tungsten, and silicon.

Preferable examples of the nitride compounds include SiN (silicon nitride), TiN (titanium nitride), WN (tungsten nitride), MoN (molybdenum nitride), and CrN (chromium nitride). Preferable examples of the silicon compounds include TiSi (titanium silicide), WSi (tungsten silicide), MoSi (molybdenum silicide), CoSi (cobalt silicide), and CrSi (chromium silicide). Preferable examples of the tungsten compounds include TiW (titanium tungsten) and MoW (molybdenum tungsten). A preferable example of silicon is non-doped silicon.

The thickness of the barrier layer B1 is preferably set within the range from 1 to 200 nm. When the thickness of the barrier layer B1 is set within the range from 30 to 50 nm, the barrier layer B1 can function as a barrier although the thickness is small and also can suppress irregular reflection. However, if the thickness of the barrier layer B1 is smaller than 3 nm, the barrier layer B1 is more likely to be unable to sufficiently prevent degradation in the light shielding performance due to oxidation of the metal layer during a high-temperature heat treatment. On the other hand, if the thickness of the barrier layer B1 is greater than 150 nm, the TFT array substrate 10 tends to be bent to a large degree. If the liquid crystal device has no degradation in the image quality, the thickness may be set to even 200 nm. The barrier layer B1 also serves as a protective layer that prevents the metal layer from being oxidized.

The metal layer M1 is made of a metal in the form of a simple substance or a compound having the ability to block light. The metal or the metal compound used herein has degradation in the light shielding performance if the metal is oxidized as a result of reaction with the insulating layer of $SiO_2$.

Preferable examples of the metal in the form of a simple substance include Ti (titanium), W (tungsten), Mo (molybdenum), Co (cobalt), Cr (chromium), Hf (hafnium), and Ru (ruthenium). Preferable examples of the metal compound include TiN (titanium nitride), TiW (titanium tungsten), and MoW (molybdenum tungsten).

Preferably, the thickness of the metal layer M1 is set within the range from 10 to 200 nm. It is undesirable to set the thickness of the metal layer M1 to a value smaller than 10 nm, because good light shielding performance cannot be obtained. On the other hand, it is undesirable to set the thickness of the metal layer M1 to a value greater than 200 nm, because the TFT array substrate 10 is bent to a large degree and thus degradation occurs in the image quality of the liquid crystal device.

A first interlayer insulating film (insulator layer) 12 is disposed between the first light shielding film 111 and the respective pixel switching TFTs 30 so that the semiconductor layer 1a forming each pixel switching TFT 30 is electrically isolated from the first light shielding film 111 by the first interlayer insulating film 12. The first interlay insulating film 12 is formed over the entire surface of the TFT array substrate 10. The surface thereof is planarized by polishing so as to eliminate the steps of the pattern of the first light shielding film 111.

The first interlayer insulating film 12 is formed of, for example, high isolation glass such as NSG (non-doped silicate glass, PSG (phosphosilicate glass), BSG (boronsilicate glass), or BPSG (boronphosphosilicate glass), or silicon oxide or silicon nitride. The first interlayer insulating film 12 also serves to prevent the pixel switching TFTs 30 from being contaminated by the first light shielding film 111.

In the present embodiment, a storage capacitor 70 is formed by extending the insulating thin film 2 from a location under the scanning line 3a so that the extended part of the insulating thin film 2 serves as a dielectric film, and extending the semiconductor film 1a so that the extended part of the semiconductor film 1a serves as a first storage capacitor electrode 1f, and furthermore employing, as a second storage capacitor electrode, a part of the capacitor line 3b at a location corresponding to the first storage capacitor electrode 1f and the dielectric film.

More specifically, the heavily doped drain region 1e of the semiconductor layer 1a is extended under the data line 6a and the scanning line 3a, and the heavily doped drain region 1e of the semiconductor layer 1a is also extended so as to oppose the capacitor line 3b extending along the data line 6a and the scanning line 3a thereby forming a first storage capacitor electrode (semiconductor layer) 1f. Because the insulating film 2, serving as the dielectric film of the storage capacitor 70, is realized using the same layer as the gate insulating film 2 of the TFT 30, wherein the gate insulating film 2 is formed on a monocrystalline silicon layer by means of high temperature oxidation, the insulating film 2 can be formed so as to be thin and so as to have a high breakdown voltage. This makes it possible to realize the storage capacitor 70 having a large capacitance in a rather small area.

Figure 2:
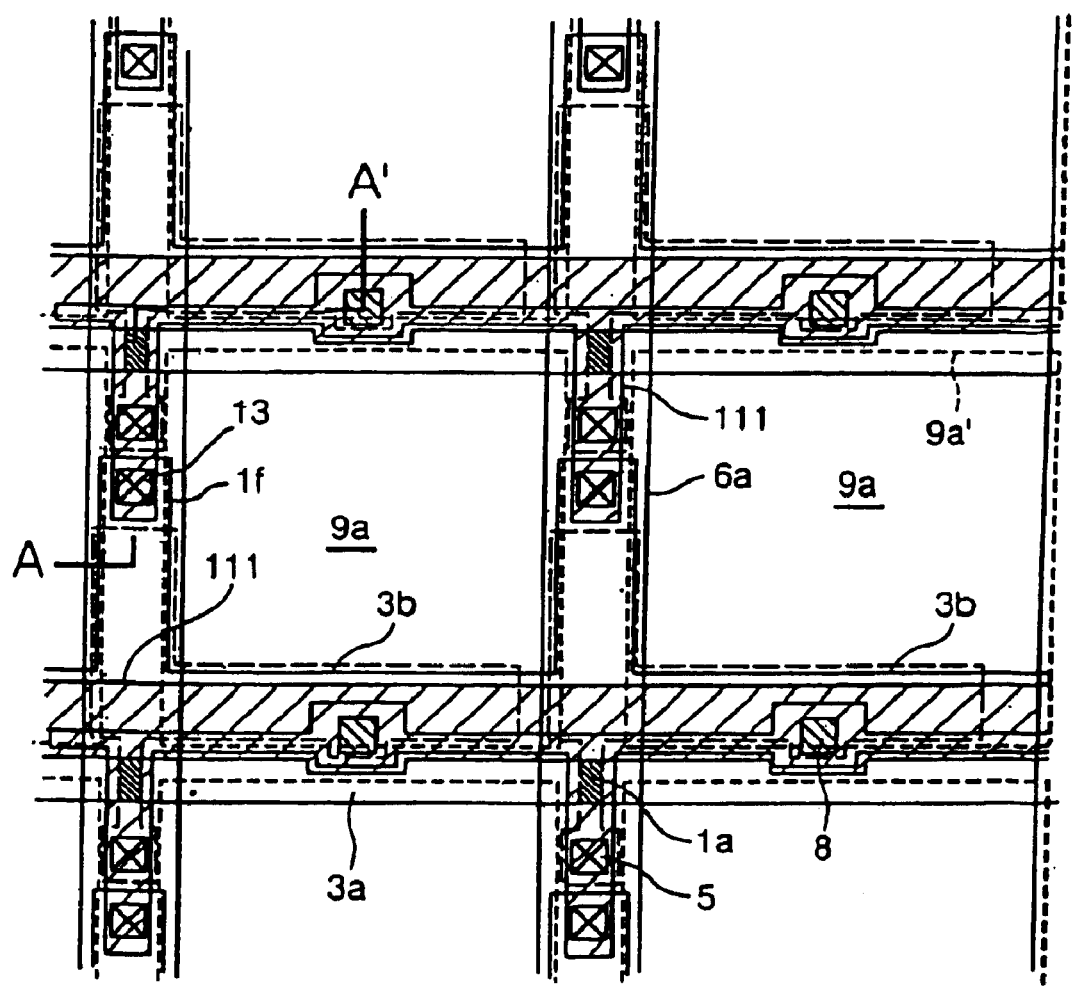
FIG. 2 is a plan view illustrating a plurality of adjacent pixels on a TFT array substrate of a liquid crystal device according to an embodiment, wherein data lines, scanning liens, and pixel electrodes are formed on the TFT array substrate.

Furthermore, in the storage capacitor 70, as can be seen from FIGS. 2 and 3, on the side opposite to the capacitor line 3b serving as the second storage capacitor electrode, a part of the first light shielding film 111 is disposed so as to face the first storage capacitor electrode 1f via the first interlayer insulating film 12 and thus so as to serve as a third storage capacitor electrode (in the storage capacitor 70 on the right side of FIG. 3) thereby increasing the storage capacitance. That is, in the present embodiment, the storage capacitor is constructed into a double storage capacitor structure in which storage capacitors are formed on both sides of the first storage capacitor electrode 1f, thereby achieving an increase in the storage capacitance. This allows the liquid crystal device to have an enhanced capability of preventing flicker or ghosting from occurring in a displayed image.

That is, it is possible to increase the storage capacitance of the pixel electrode 9a by making effective use of a space, other than the open area, such as an area under the data line 6a or an area (where the capacitor line 3b is formed) along the scanning line 3a in which disclination occurs in the liquid crystal.

In the present embodiment, the first light shielding film 111 (and the capacitor line 3b electrically connected thereto) is electrically connected to a constant potential source so that the first light shielding film 111 and the capacitor line 3b are maintained at a constant potential. Therefore, the potential variation of the first light shielding film 111 does not exert an adverse effect on the pixel switching TFTs 30 disposed at locations opposing the first light shielding film 111. Furthermore, the capacitor line 3b can function as a good second electrode of the storage capacitor 70. The constant potential source used for the above purpose may be selected from the group including of the negative and positive constant potentials supplied to a peripheral circuit (such as the scanning line driver circuit or the data line driver circuit) that drives the liquid crystal device, the ground potential, and the constant potential supplied to the opposite electrode 21. By employing a power supply in the peripheral circuit, it becomes possible to maintain the first light shielding film 111 and the capacitor line 3b at a constant potential without having to provide an additional dedicated potential interconnection or an external input terminal.

In the present embodiment, as described above with reference to FIGS. 2 and 3, the first light shielding film 111 is formed on the TFT array substrate 10 and electrically connected via a contact hole 13 to the capacitor line 3b at the preceding or following stage. Thus, compared with the case in which each first light shielding film 111 is electrically connected to the capacitor line at the following stage, the level difference caused by steps is decreased between the area where the capacitor line 3b and the first light shielding film 111 are formed along the edge of the open area of the pixel area such that they overlap with the data line 6a and the other areas. The reduction in the level difference caused by the steps allows a reduction in disclination (alignment failure) created in the liquid crystal by the level difference. This makes it possible to increase the open area of the pixel area.

As described earlier, the first light shielding film 111 has a contact hole 13 formed in the branch thereof branching from the main part extending in the form of a straight line. It is known that creation of a crack can be suppressed by forming the contact hole 13 at a location close to the edge so that stress diverges from the edge. The stress imposed upon the first light shielding film 111 during the production process is reduced depending upon how close the location of the contact hole 13 is to the edge of the branch (preferably the contact hole 13 is formed at a location as close to the edge as allowed by the margin), thereby preventing a crack from being created and thus allowing an increase in the production yield.

The capacitor line 3b and the scanning line 3a are formed of the same polysilicon film, the dielectric film of the storage capacitor 70 and the gate insulating film 2 of the TFT 30 are formed of the same high-temperature oxide film, and the first storage capacitor electrode if, the channel region 1a, the source region 1d and the drain region 1e of the TFT 30 are formed in the same semiconductor layer 1a, and thus the multilayer structure formed on the TFT array substrate 10 is simplified. Furthermore, in the production of the liquid crystal device, the capacitor line 3b and the scanning line 3a can be formed at the same time in the same thin-film formation step, and the dielectric film of the storage capacitor 70 and the gate insulating film 2 can be formed at the same time.

Furthermore, as shown in FIG. 2, the first light shielding film 111 extends along the respective scanning lines 3a, and is divided into a plurality of stripes along the data lines 6a. This allows a great reduction in the stress in the multilayer structure including the first light shielding film 111, the scanning line 3a, the capacitor line 3b, the data line 6a, and the interlayer insulating film, which occurs due to differences in physical properties among the respective films during heating or cooling during the production process, compared with the case in which light shielding film is formed in the shape of a lattice surrounding the open area of each pixel. This makes it possible to prevent a crack from being created in the first light shielding film 111, and thus an increase in the production yield is achieved.

Although in the example shown in FIG. 2, the main straight-line part of the first light shielding film 111 is formed so as to substantially overlap the main straight-line part of the capacitor line 3b, the main straight-line part of the first light shielding film 111 is not limited to such a location as long as the channel region of the TFT 30 is covered with the first light shielding film 111 and the first light shielding film 111 overlaps the capacitor line 3b at some location, so that the contact hole 13 can be formed in the overlapped part, thereby ensuring that the TFT is protected from illumination of light and that the capacitance line has low resistance. Thus, the first light shielding film 111 may also be formed in an elongated gap extending, in a direction along a scanning line, between the adjacent scanning line 3a and the capacitor line 3b, or may be formed even in an area slightly overlaps the scanning line 3a.

The capacitor line 3b and the first light shielding film 111 are electrically connected to each other in a highly reliable fashion via the contact hole 13 formed in the first interlayer insulating film 12. The contact holes 13 for such a purpose may be formed such that one contact hole is provided for each pixel or such that one contact hole is provided for each group including a plurality of pixels.

In the case where one contact hole 13 is formed for each pixel, the reduction in the resistance of the capacitor line 3b achieved by the first light shielding film 111 is further enhanced, and the degree of structural redundancy between the first light shielding film 111 and the capacitor line 3b is increased. On the other hand, in the case where one contact hole 13 is formed for each group including a plurality of pixels (for example, one contact hole is formed for each group including two or three pixels), a compromise can be made properly between the benefits provided by the first light shielding film 111 in terms of the reduction in the resistance of the capacitor line 3b and the redundant structure and the disadvantage that formation of a large number of contact holes 13 makes the production process complicated and the production yield of the liquid crystal device is reduced, depending upon the desired specifications in terms of the sheet resistance of the capacitor line 3b and the first light shielding film 111, the driving frequency, etc. This feature is very useful in practical applications.

The contact holes 13 provided for each pixel or each group of pixels are formed at locations under the data lines 6a when viewed from the side of the opposite substrate 20. This means that the contact holes 13 are formed in the first interlayer insulating film 12 in areas in which no TFTs 30 and no first storage capacitor electrodes if are formed so that the locations of the contact holes 13 are apart from the open areas of the pixels. This makes it possible to make efficient use of the pixel area and to prevent the TFT 30 and interconnections from encountering defects caused by formation of the contact hole 13.

Referring again to FIG. 3, each pixel switching TFT 30 is constructed in the form of a LDD (Lightly Doped Drain) structure including a scanning line 3a, a channel region 1a' in a semiconductor layer 1a in which a channel is formed by an electric field applied by the scanning line 3a, an insulating thin film 2 that electrically isolates the scanning line 3a and the semiconductor layer 1a from each other, a data line 6a, a lightly doped source region (LDD region on the side of the source) 1b and a lightly doped drain region (LDD region on the side of the drain) 1c formed in the semiconductor layer 1a, and a heavily doped source region 1d and a heavily doped drain region 1e formed in the semiconductor layer 1a.

The heavily drain region 1e is connected to corresponding one of the plurality of pixel electrodes 9a. The source regions 1b and id and the drain regions 1c and 1e are formed by doping the semiconductor layer 1a with a particular concentration of n-type or p-type dopant depending upon whether the channel is to be of the n or p type. The n-channel TFT has the advantage that it can operate at a high speed and thus n-channel TFTs are usually employed as the pixel switching TFTs 30. The data line 6a is formed of an opaque thin film. Specific examples of the opaque thin film include a metal film such as an Al film and an alloy film, such as a metal silicide film. The second interlayer insulating film 4 is formed over the scanning line 3a, the gate insulating film 2, and the first interlayer insulating film 12, wherein contact holes 5 reaching the respective heavily doped source regions 1d and contact holes 8 reaching the respective heavily doped drain regions are formed in the second interlayer insulating film 4. The data lines 6a are electrically connected to the corresponding heavily doped source regions 1d via the source-region contact holes 5. Furthermore, the third interlayer insulating film 7 is formed over the data lines 6a and the second interlayer insulating film 4, wherein contact holes 8 for the heavily doped drain regions 1e are formed in the third interlayer insulating film 7. Each pixel electrode 9a is electrically connected to the corresponding heavily doped drain region 1e via the drain-region contact holes 8. The pixel electrodes 9a described above are formed on the upper surface of the third interlayer insulating film 7 formed in the above-described manner. The pixel electrode 9a and the corresponding heavily doped drain region 1e may be electrically connected to each other via an aluminum film formed of the same film as that of the data line 6a or via a polysilicon film formed of the same film as that of the scanning line 3b.

As described above, each pixel switching TFT 30 is preferably formed so as to have the LDD structure. However, the pixel switching TFTs 30 may also be formed into an offset structure in which no impurity ions are implanted into the lightly doped source region 1b and the lightly doped drain region 1c. Alternatively, the pixel switching TFTs 30 may be formed into a self-aligned structure which may be obtained by implanting high-concentration impurity ions using the gate electrode 3a as a mask thereby forming heavily doped source and drain regions in a self-aligned manner.

Although in the present embodiment, each pixel switching TFT 30 has a single-gate structure, in which only a single gate electrode (formed of a part of the scanning line 3a) is disposed between the source region 1b and the drain region 1e, two or more gate electrodes may be disposed between the source and drain regions. In this case, the same signal is applied to those two or more gate electrodes. In the case where the dual gate structure or the triple gate structure is employed, the resultant TFT has a less leakage current at junctions between the channel and the source and drain regions, and thus the current in the off-state can be reduced. If at least one of these gate electrodes is formed into the LDD or offset structure, a further reduction in the off-current can be achieved, and thus a highly reliable switching element can be obtained.

In general, if the semiconductor layer 1a, made of the monocrystalline silicon layer including the channel region 1a', the lightly doped source region 1b, and the lightly doped drain region 1c is illuminated with light, a photocurrent is generated due to the photoelectric conversion effect of the silicon, and such a photocurrent results in degradation in the transistor characteristics of the TFT 30. In the present embodiment, to prevent the above problem, the data line 6a, is formed of an opaque thin metal film such as Al so that the scanning line 3a is covered with the data line 6a thereby effectively preventing light from falling on at least the channel region 1a' and the LDD regions 1b and 1c of the semiconductor layer 1a. Furthermore, as described above, the first light shielding film 111 is disposed under each pixel switching TFT 30 so that returning light is effectively prevented from falling on at least the channel region 1a' and the LDD regions 1b and 1c of the semiconductor layer 1a. The semiconductor material used to form the switching TFTs 30 has a polycrystalline or monocrystalline structure. In the case where a monocrystalline semiconductor is used, the semiconductor layer may be formed by first adhesively bonding a monocrystalline silicon substrate and a supporting substrate to each other, and then thinning the monocrystalline substrate. Such a structure in which a thin film of monocrystalline silicon is formed on an insulating layer is called SOI (Silicon On Insulator), and such a substrate is called a bonded SOI substrate.

In the present embodiment, because the first light shielding film 111 is connected to the capacitor line 3b formed at a pixel in a directly adjacent preceding or following stage, it is necessary to have a special capacitor line 3b that supplies the constant potential to the first light shielding film 111 of pixels in the top or bottom stage? [line]. To this end, the number of capacitor lines 3b may be greater by one than the number of pixels as counted in a vertical direction.

A process of producing the liquid crystal apparatus with the above-described structure is described below.

First, a TFT array substrate 10 made of a material such as quartz or hard glass is prepared. Thereafter, by sputtering, a metal layer M1 is formed over the entire surface of the TFT array substrate 10 and then a barrier layer B1 is formed thereon. Thereafter, by photolithography, a resist mask having a pattern corresponding to the first light shielding film 111 (FIG. 2) is formed, and the metal layer M1 and the barrier layer B1 are etched via the resist mask thereby forming the first light shielding film 111 having a pattern such as that shown in FIG. 2. Thereafter, the remaining layers shown in FIG. 3 are formed using known techniques, and thus a complete TFT array substrate 10 is obtained.

The production process is described in further detail below with reference with a specific example.

After forming a Ti layer M1 serving as the metal layer on a TFT array substrate 10 made of an insulating quartz substrate, a WSi film B1, serving as the barrier layer, is formed thereby forming the first light shielding film 111.

Thereafter, on the first light shielding film 111, the first interlayer insulating film 12 is formed of NSG.

More specifically, the process of forming the first interlayer insulating film of NSG on the first light shielding film 111 is performed at a temperature equal to or higher than 500° C., such as 680° C. Thereafter, densification is performed at a temperature equal to or lower than 1100° C., such as 1000° C. In the above process, although the Ti film M1 bonds with oxygen contained in the insulating substrate 10 made of quartz, the oxidation of Ti is suppressed by the WSi film B1, which is a metal compound containing no oxygen and which is disposed on the opposite side. As a result, a significant reduction in the transmittance of the Ti film M1 is prevented. In the case where the WSi film B1 is not formed on the Ti film M1, oxidation occurs during the process of forming NSG. The chemical reaction in the oxidation during this process is more active than in the process of forming a Ti film on the TFT array substrate 10 made of quartz, and thus a significant reduction in the transmittance of the Ti film M1 occurs.

The opposite substrate 20 is produced as follows. First, a glass substrate or the like is prepared. A second light shielding film 23 is formed by first sputtering chromium and then performing a photolithography process and an etching process. Thereafter, the remaining layers shown in FIG. 3 are formed using known techniques to obtain a complete opposite substrate 20.

Finally, the TFT array substrate 10 and the opposite substrate 20, on which various layers have been formed as described above, are boned to each other via a sealing material such that the alignment films 16 and 22 face each other. A liquid crystal, containing two or more kinds of nematic liquid crystals, is placed into the space between the two substrates by, for example, sucking, thereby forming a liquid crystal layer 50 with a predetermined thickness.

(General Structure of the Liquid Crystal Device)

Figure 7:
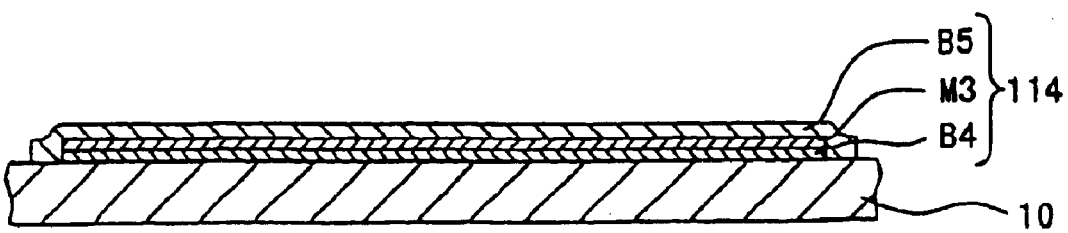
FIG. 7 is a schematic diagram illustrating still another example of a light shielding film according to the present invention.
Figure 8:
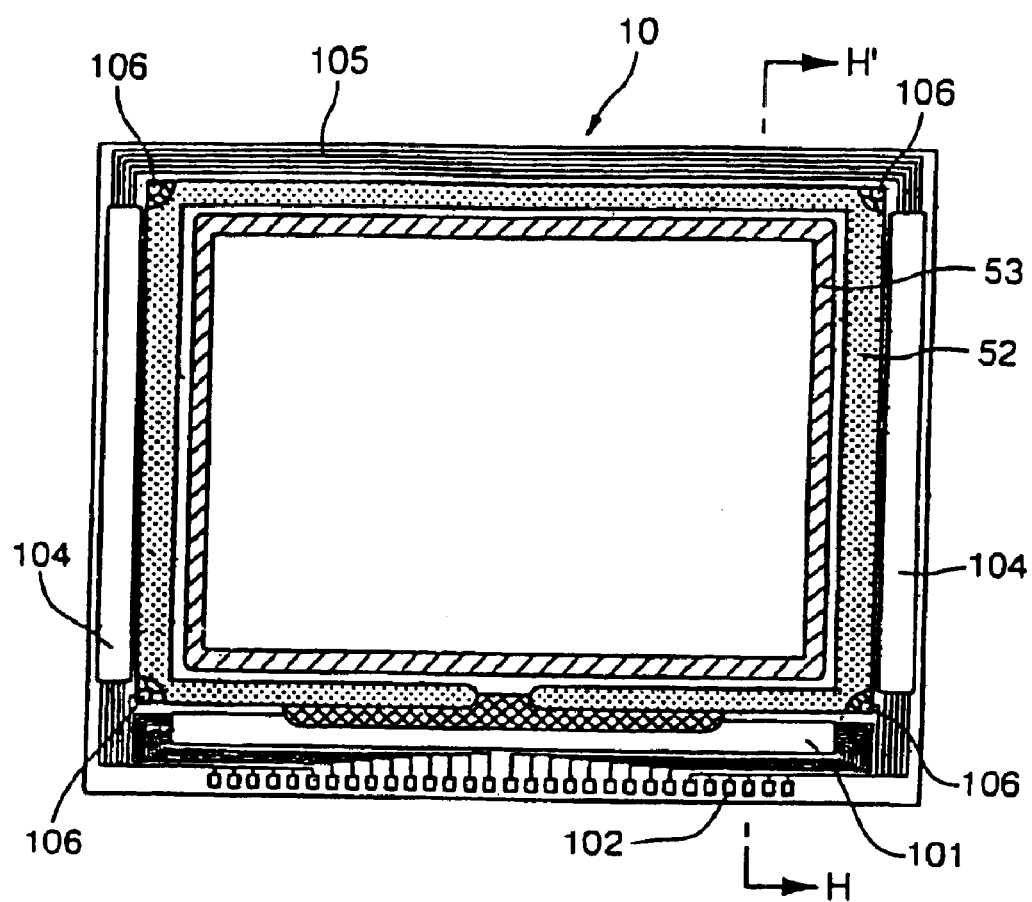
FIG. 8 is a plan view, as viewed from the side of an opposite substrate, of a liquid crystal device including a TFT array substrate on which various elements are formed, according to an embodiment.

Referring to FIGS. 8 and 9, the general structure of the liquid crystal device according to one of the embodiments is described below. FIG. 8 is a plan view, as viewed from the side of an opposite substrate 20, of a TFT array substrate 10 on which various elements are formed, and FIG. 9 is a cross-sectional view taken along plane H—H' of FIG. 7, wherein the opposite substrate 20 is also shown in FIG. 9.

In FIG. 8, a sealing material 52 is disposed on the TFT array substrate 10 along the edge of the opposite substrate 20. A third light shielding film 53, serving as a peripheral frame, formed of the same material as the second light shielding film 23 or a different material, is disposed inside the sealing material 52. In an area outside the sealing material 52, a data line driver circuit 101 and external connection terminals 102 are disposed along one side of the TFT array substrate 10, and scanning line driver circuits 104 are disposed along two sides adjacent to the above-described side. In the case where a delay in the propagation of the scanning signal supplied to the scanning lines 3a is allowed, the scanning line driver circuit 104 may be disposed only on one side.

The data line driver circuit 101 may be divided into two parts and they may be disposed at two sides of the image displaying area. For example, one data line driver circuit, disposed along one side of the image display area, may supply an image signal to odd-numbered data lines 6a and the other data line driver circuit disposed along the opposite side of the image displaying area may supply an image signal to even-numbered data lines. When the data lines 6a are driven in the comb-tooth fashion as described above, the area where the data line driver circuit is formed can be expanded, and thus it becomes possible to employ a complicated circuit.

A plurality of interconnections 105 extend along the remaining side on the TFT array substrate 10 so that the two scanning line driver circuits 104 disposed at two sides of the image displaying area are connected to each other via the interconnections 105. Furthermore, a precharging circuit may be formed behind the third light shielding film 53 serving as the peripheral frame. A conducting element 106 is disposed, at least, at one corner of the opposite substrate 20 so that the TFT array substrate 10 and the opposite substrate 20 are electrically connected via the conducting element 106. As shown in FIG. 9, the opposite substrate 20, having an outer shape and size similar to those of the sealing material 52, shown in FIG. 8, is bonded to the TFT array substrate 10 via the sealing material 52.

Furthermore, on the TFT array substrate 10 of the liquid crystal device, there may be provided a test circuit for testing the quality or detecting a defect in the liquid crystal device during the production process or before shipment. The data line driver circuit 101 and the scanning line driver circuit 104 may not be formed on the TFT array substrate 10, and instead in a driver LSI mounted on a TAB (tape automated bonding substrate) and electrically and mechanically connected to the TFT array substrate 10 via an anisotropic conducting film. A polarizing film, an optical retardation film, and/or a polarizing means are properly disposed on the side of the opposite substrate 20 where projected light falls on and also on the side of the TFT array substrate 10 from which the projection light ray emerges, depending on the operation mode such as a TN (twisted nematic) mode, a STN (super TN) mode, a D-STN (double scan STN) mode, or normally white mode/normally black mode.

When the above-described liquid crystal device is used in a color liquid crystal projector (projection-type display device), three similar liquid crystal devices are used as R (red), G (green), and B (blue) light valves, respectively, wherein light rays with different colors created by passing a light ray through RGB color separation dichroic mirrors are passed through the respective liquid crystal devices. Therefore, in the present embodiment, no color filter is disposed on the opposite substrate 20. However, a RGB color filter with a protective film may also be formed on the opposite substrate 20, in proper areas corresponding to the pixel electrodes 9a where the second light shielding film 23 is not formed. This allows the liquid crystal device according to the embodiment described above to be employed in a color liquid crystal device of a type other than the liquid crystal projector, such as a direct-view-type or reflection-type color liquid crystal television set. Furthermore, micro lenses may be formed on the opposite substrate 20, at locations corresponding to the respective pixels so that the incident light is focused in a more efficient fashion thereby achieving a brighter liquid crystal device. Still furthermore, an interference film that includes a large number of layers with different refractive index may be deposited on the opposite substrate 20 thereby forming a dichroic filter for producing a RGB color utilizing interference of light. By adding the dichroic filter to the opposite substrate, a still brighter color liquid crystal device can be achieved.

Although in the liquid crystal device according to the present embodiment, light is incident on the liquid crystal device from the side of the opposite substrate 20 as in the conventional liquid crystal devices, light may be incident on the device from the side of the TFT array substrate 10 and may emerge from the side of the opposite substrate 20, because the light shielding film 111 is disposed on the TFT array substrate 10. That is, when the liquid crystal device is mounted on the liquid crystal projector, the channel region 1a' and the LDD regions 1b and 1c of the semiconductor layer 1a are protected from illumination of light, and thus it is possible to display a high-quality image. In the conventional techniques, to prevent light from being reflected at the back surface of the TFT array substrate 10, it is necessary to place polarizing means coated with an AR (anti-reflection) film at an outer location or it is necessary to bond an AR film to the TFT array substrate 10. In contrast, in the embodiments of the present invention, because the first light shielding film 111 is formed between the surface of the TFT array substrate 10 and the semiconductor layer 1a at least at locations corresponding to the channel region 1a' and the LDD regions 1b and 1c, it is unnecessary to use an antireflection film or polarizing device coated with an antireflection film, and it is also unnecessary to perform an antireflection process on the TFT array substrate 10 itself. Thus, in the present embodiment, it is possible to reduce the material cost. Furthermore, because the polarizing means is not required, no reduction in the production yield due to dust or defects occurs during the process of bonding a polarizing plate. Still furthermore, the excellent light shielding property makes it possible to employ a bright light source or a polarizing beam splitter to achieve an enhanced light usage efficiency without causing degradation in the image quality such as light crosstalk.

Furthermore, because the liquid crystal device has the first light shielding film 111 including the barrier layer B1 and the metal layer M1, substantially no undesirable photocurrent is created which would occur if the light shielding performance of the first light shielding film 111 is not good enough. Thus, the obtained liquid crystal device can be advantageously used in an electronic device including a high-intensity light source.

That is, because the first light shielding film 111 has the barrier layer B1 formed on the side facing the pixel switching TFTs 30, oxidation between the metal layer M1 and the first interlayer insulating film 12 is suppressed by the presence of the barrier layer B1 containing no oxygen formed on the metal layer M1, during the high-temperature heat treatment such as annealing performed, after the formation of the first light shielding film 111, to form the first interlayer insulating film 12 or the pixel switching TFT 30. Thus, a reduction in the light shielding ability caused by oxidation of the material of the metal layer M1 is prevented, and it is ensured that the first light shielding film 111 has high light shielding performance.

That is, it becomes possible to employ a material having high light shielding performance such as Ti to form the metal layer M1 thereby forming the first light shielding film 111 having high light shielding performance.

Furthermore, because a reduction in the light shielding ability of the first light shielding film 111 does not easily occur during the high-temperature heat treatment and the high light shielding ability is maintained, it is possible to reduce the thickness of the light shielding film 111 compared with the thickness of the conventional light shielding film. This makes it possible to form the pattern of the first light shielding film 111 in a shorter etching time than is required for the conventional light shielding film. Furthermore, it becomes possible to increase the life of a sputtering target and to reduce the amount of gas used to form the first light shielding film 111.

In the first light shielding film 111, by forming the barrier layer B1 using a preferable material selected from the group including nitride compounds, silicon compounds, tungsten compounds, tungsten, and silicon, it becomes possible for the barrier layer B1 to more effectively suppress oxidation of the material of the metal layer M1, thereby more effectively suppressing the degradation in the light shielding performance of the first light shielding film 111 during the high-temperature heat treatment.

Furthermore, by forming the metal layer M1 using a preferable material selected from the group including a metal in the form of a simple substance or a metal compound, the light shielding performance of the first light shielding film 111 is further enhanced.

In particular, when the material of the barrier layer B1 is selected from the group including WSi, MoSi, TiSi, CoSi, and CrSi, and the material of the metal layer M1 is selected from the group including Ti, Mo, W, the material of the barrier layer serves as a donor of Si and the material of the metal layer M1 serves as an acceptor of Si. As a result, the stress caused by differences in the physical properties between the barrier layer B1 and the metal layer M1 is reduced, and a stable relationship is achieved between the barrier layer B1 and the metal layer M1. Thus, it becomes possible for the barrier layer B1 to more effectively suppress oxidation of the material of the metal layer M1, thereby more effectively suppressing the degradation in the light shielding performance of the first light shielding film 111 during the high-temperature heat treatment.

The stable relationship between the barrier layer B1 and the metal layer M1 makes it possible to prevent a crack from being generated in the first light shielding film 111 during heating or cooling in the production process, and thus the production yield is enhanced.

If the thickness of the barrier layer B1 is selected within the range from 1 to 200 nm, it is possible to sufficiently prevent a degradation in the light shielding performance due to the high-temperature heat treatment while suppressing the amount of bending of the TFT array substrate 10, and thus the characteristics of the first light shielding film 111 are further enhanced.

If the thickness of the metal layer M1 is selected within the range from 10 to 200 nm, sufficiently high light shielding performance can be obtained while suppressing the amount of bending of the TFT array substrate 10, and thus the characteristics of the first light shielding film 111 are still further enhanced.

[Second Embodiment]

A second embodiment of the present invention is described below with reference to FIG. 4.

Figure 4:
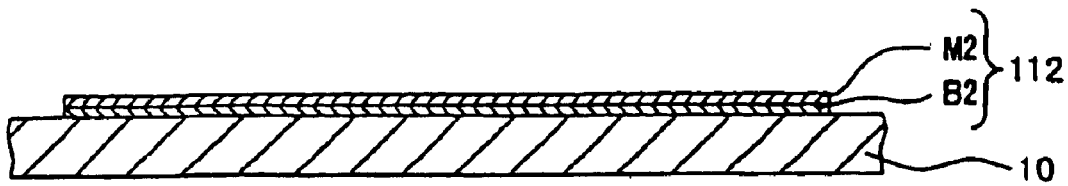
FIG. 4 is a schematic diagram illustrating another example of a light shielding film according to the present invention.

The present embodiment is different from the first embodiment in that the first light shielding film 111 provided in the liquid crystal device shown in FIG. 3 is replaced with a first light shielding film 112 including, as shown in FIG. 4, a barrier layer B2 and a metal layer M1, wherein the barrier layer B2 is formed on the TFT array substrate 10 and the metal layer M1 is formed on the barrier layer B2.

Because the present embodiment is different from the first embodiment only in the first light shielding film as described above, FIG. 4 shows only the TFT array substrate and the first light shielding film and does not show the other parts which are similar to those in the first embodiment.

In FIG. 4, reference numeral 10 denotes a TFT array substrate. On the TFT array substrate 10, there is provided the first light shielding film 112 that includes the barrier layer B2 and the metal layer M2 formed on the barrier layer B2.

The barrier layer B2 and the metal layer M2 of the first light shielding film 112 may be formed of similar materials with similar thicknesses to those of the barrier layer B1 and the metal layer M1 of the first light shielding film 111 according to the first embodiment.

A method of producing the liquid crystal device is described below. First, a TFT array substrate 10 made of a material, such as quartz or hard glass, is prepared. Thereafter, by sputtering or CVD, a barrier layer B2 is formed over the entire surface of the TFT array substrate 10 and then a metal layer M2 is formed thereon. Thereafter, the remaining process required to obtain a complete TFT array substrate 10 is performed in a similar manner to the first embodiment. Furthermore, an opposite substrate 20 is formed in a similar manner to the first embodiment and adhesively bonded to the TFT array substrate 10 to construct a liquid crystal device.

That is, because the first light shielding film 112 of the liquid crystal device has the barrier layer B2, the barrier layer B2 suppresses oxidation of the surface, on the side of the barrier layer B2, that is, the side facing the TFT array substrate 10, of the metal layer M2 during the high-temperature heat treatment performed after the formation of the first light shielding film 112. Thus, a reduction in the light shielding ability caused by oxidation of the material of the metal layer M2 is prevented, and it is ensured that the first light shielding film 112 has high light shielding performance. As a result, it becomes possible to form the metal layer M2 having high light shielding performance, using a material which is excellent in terms of the ability to block light but which has been thought of as having the problem that degradation in its light shielding ability occurs during the high-temperature heat treatment, thereby forming the first light shielding film 112 having high light shielding performance.

In the case where the barrier layer B2 is formed of silicon, the silicon may be doped or undoped polysilicon. When undoped polysilicon is employed, peeling of the barrier layer B2 is suppressed. This allows the barrier layer B2 to be thicker than 200 nm. When doped polysilicon is employed, it is possible to prevent degradation in the light shielding performance due to oxidation of the metal layer, even if the thickness is as small as 1 nm.

Furthermore, because the liquid crystal device has the first light shielding film 112, including the barrier layer B2 and the metal layer M2, substantially no undesirable photocurrent is created which would occur if the light shielding performance of the first light shielding film 112 is not good enough. Thus, the obtained liquid crystal device can be advantageously used in an electronic device including a high-intensity light source.

[Third Embodiment]

A third embodiment of the present invention is described below with reference to FIG. 5.

Figure 5:
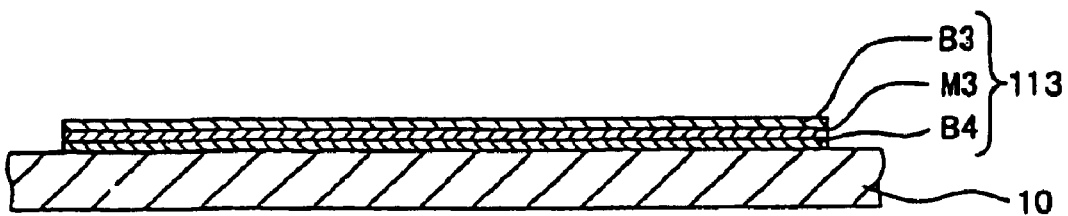
FIG. 5 is a schematic diagram illustrating still another example of a light shielding film according to the present invention.

The present embodiment is different from the first embodiment in that the first light shielding film 111 provided in the liquid crystal device shown in FIG. 3 is replaced with a first light shielding film 113 including, as shown in FIG. 5, a metal layer M3 and two barrier layers B3 and B4. The metal layer M3 is formed between the barrier layers B3 and B4.

Because the present embodiment is different from the first embodiment only in the first light shielding film as described above, FIG. 5 shows only the TFT array substrate and the first light shielding film and does not show the other parts which are similar to those in the first embodiment.

In FIG. 5, reference numeral 10 denotes a TFT array substrate. On the TFT array substrate 10, there is provided the first light shielding film 113 that includes the barrier layer B4, the metal layer M3 formed on the barrier layer B4, and the barrier layer B3 formed on the metal layer M3.

Preferably, the barrier layers B3 and B4 of the first light shielding film 113 are formed of a material similar to that of the barrier layer B1 of the first light shielding film 111 according to the first embodiment described above. The thicknesses of the barrier layers B3 and B4 may be set to a value similar to that of the barrier layer B1 of the first light shielding film 111 according to the first embodiment described above.

The metal layer M3 of the first light shielding film 113 may be formed of a similar material with a similar thickness to those of the metal layer M1 of the first light shielding film 11 according to the first embodiment described above.

A method of producing the liquid crystal device is described below. First, a TFT array substrate 10 made of a material, such as quartz or hard glass, is prepared. Thereafter, by sputtering, a barrier layer B4, a metal layer M3, and a barrier layer B3 are successively formed in this order from the bottom to the top over the entire surface of the TFT array substrate 10. Thereafter, the remaining process required to obtain a complete TFT array substrate 10 is performed in a similar manner to the first embodiment. Furthermore, an opposite substrate 20 is formed in a similar manner to the first embodiment and adhesively bonded to the TFT array substrate 10 to construct a liquid crystal device.

In the first light shielding film 113 of the liquid crystal device, because the metal layer M3 is sandwiched between the two barrier layers B3 and B4, the barrier layers B3 and B4 suppress oxidation of both surfaces, on the side of facing the TFT array substrate 10 and on the opposite side, of the metal layer M3 during the high-temperature heat treatment performed after the formation of the first light shielding film 113. Thus, a reduction in the light shielding ability caused by oxidation of the material of the metal layer M3 is prevented in a more effective manner, and it is ensured that the first light shielding film 113 has high light shielding performance. As a result, it becomes possible to form the metal layer M3 having high light shielding performance, using a material which is excellent in terms of the ability to block light but which has been thought of as having the problem that degradation in the light shielding ability occurs during the high-temperature heat treatment, thereby forming the first light shielding film 113 having high light shielding performance.

A specific example of the first light shielding film 113 is described below in which a Ti film is employed as the metal layer M3 and WSi films are employed as the upper and lower barrier layers B3 and B4.

The light shielding ability can be enhanced by forming the WSi films B3 and B4 on the upper and lower surfaces of the Ti film M3. However, the thickness of the light shielding film becomes greater, and thus steps are created on the surface of the alignment film 16 when the pixel switching TFTs 30 and the interconnections such as the data lines 6a are formed into a multilayer structure. Such steps can result in degradation in the quality of a displayed image.

To avoid the above problem, it is desirable that the thickness of the Ti film M3 be selected within the range from 30 nm to 50 nm, the thickness of the lower WSi film B4 facing the TFT array substrate 10 be selected within the range from 10 nm to 20 nm, and the thickness of the upper WSi film B3 be selected within the range from 30 nm to 100 nm. Selecting the thickness of the lower WSi film B4 within the range from 10 nm to 20 nm allows the light shielding film to be more capable of absorbing light and thus more capable of shielding light than a light shielding film formed of a single layer of WSi film with a thickness of 200 nm.

Although the capability of shielding light is enhanced by increasing the thickness of the upper WSi film B3, the thickness may be selected within the range from 50 nm to 100 nm to obtain sufficient capability of shielding light. The first light shielding film 113 constructed in the above-described manner has capability of effectively shielding light with a wavelength in the range smaller than 400 nm, and thus it is possible to prevent the liquid crystal from being degraded by a blue light component.

Furthermore, because the liquid crystal device has the first light shielding film 113, generation of undesirable photocurrent, which would occur if the light shielding performance of the first light shielding film 113 is not good enough, is further suppressed, and thus the obtained liquid crystal device can be advantageously used in an electronic device including a higher-intensity light source.

[Fourth Embodiment]

A fourth embodiment of the present invention is described below with reference to FIG. 6.

Figure 6:
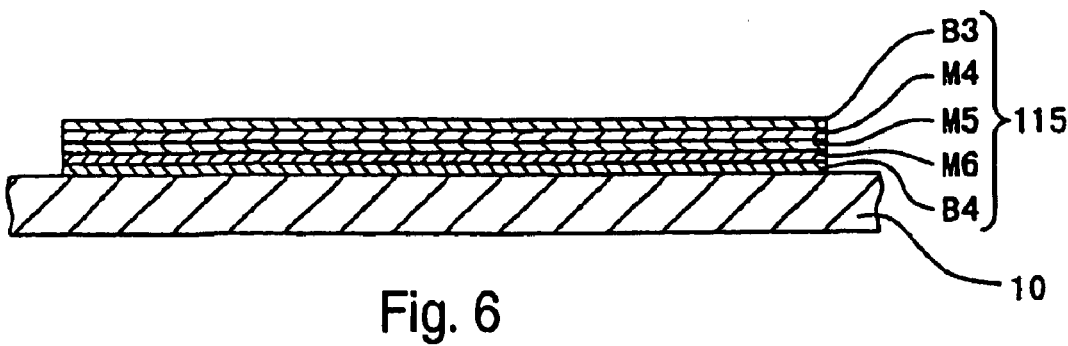
FIG. 6 is a schematic diagram illustrating still another example of a light shielding film according to the present invention.

The present embodiment is different from the third embodiment described above in that the metal layer M3, shown in FIG. 5, of the first light shielding film 113 provided in the liquid crystal device is formed into a three-layer structure as shown in FIG. 6.

Because the present embodiment is different from the third embodiment only in the first light shielding film as described above, FIG. 6 shows only the TFT array substrate and the first light shielding film and does not show, as in the third embodiment shown in FIG. 5, the other parts which are similar to those in the first embodiment.

In FIG. 6, reference numeral 10 denotes a TFT array substrate. On the TFT array substrate 10, there is provided a first light shielding film 115 that includes a barrier layer B4, a metal layer M6, a metal layer M5, a metal layer M4, and a barrier layer B3, formed in this order from the bottom to the top.

The metal layers M5 and M6 are formed of the same light-reflective metal in the form of a simple substance or a metal compound as that used in the first embodiment to form the metal layer. The metal layers M4 and M6 between which the metal layer M5 is disposed are formed of a light-absorbable metal compound, such as TiN.

Preferably, the metal layers M4, M5, and M6 of the first light shielding film 115 are formed so that the sum of their thickness is equal to a value similar to the thickness of the metal layer M1 of the first light shielding film 111 according to the first embodiment described above.

The barrier layers B3 and B4 of the first light shielding film 115 may be formed of similar materials similar with similar thicknesses to those of the barrier layers B3 and B4 of the first light shielding film 113 according to the third embodiment described above.

Furthermore, it is desirable that the barrier layers B3 and B4 be formed of a material selected from the group including WSi, MoSi, TiSi, and CoSi, the metal layers M4 and M6 of the three-layer metal film including the metal layers M4, M5, and M6 be formed of a material selected from the group including Ti, Mo, and W, and the metal layer M5 in the center of the three-layer metal film be formed of a material selected from the group including nitride compounds and silicon compounds. Selecting such materials makes it possible to prevent the metal layers M4 and M6 from being broken during the film formation process, due to formation of a crack caused by expansion or compression resulting from a mechanical reaction. The metal layer M5 may also be formed of W to achieve similar effects.

A method of producing the liquid crystal device is described below. First, a TFT array substrate 10 made of a material such as quartz or hard glass is prepared. Thereafter, by sputtering or CVD, a barrier layer B4, a light-reflective metal layer M6, a light-reflective metal layer M5, a light-absorbable metal layer M4, and a barrier layer B3 are successively formed in this order from the bottom to the top over the entire surface of the TFT array substrate 10. Thereafter, the remaining process required to obtain a complete TFT array substrate 10 is performed in a similar manner to the first embodiment. Furthermore, an opposite substrate 20 is formed in a similar manner to the first embodiment and adhesively bonded to the TFT array substrate 10 to construct a liquid crystal device.

In the first light shielding film 113 of the liquid crystal device, because the metal layers M4, M5, and M6 are disposed between the two barrier layers B3 and B4, it is ensured, as in the third embodiment, that no significant degradation occurs in the ability of the first light shielding film 113 to block light during the high-temperate treatment performed after forming the first light shielding film 113, and thus it is ensured that the first light shielding film 115 has high light shielding performance.

Because the metal layer M4 on the side of the pixel switching TFTs is formed of a material capable of absorbing light, light incident upon the metal layer M4 is absorbed and is not reflected back to the pixel switching TFTs. Furthermore, because the metal layer M6 on the side of the TFT array substrate 10 is formed of a material capable of reflecting light, it is possible to reflect light entering from the side of the TFT array substrate 10. Thus the first light shielding film 115 is capable of more effectively reducing light leakage amount in the TFTs.

Furthermore, the relationships between the barrier layers B3 and B4 and the metal layers M4, M5, and M6 become stable, and thus it makes it possible to prevent a crack from being generated in the first light shielding film 115 during heating or cooling in the production process, and thus the production yield is enhanced.

Furthermore, in the case where the barrier layers B3 and B4 are formed of a material selected from the group including WSi, MoSi, TiSi, and CoSi, the metal layer M5 in the center of the three-layer metal film including the metal layers M4, M5, and M6 is formed of a material selected from the group including Ti, Mo, and W, and the metal layers M6 and M4 on the sides of the respective barrier layers B3 and B4 is formed of a nitride of the material employed to form the metal layer M5 in the center, a further reduction in the stress due to the differences in the physical properties among the respective layers is achieved. Thus, the relationships among the respective layers become more stable, and thus the benefits obtained by forming the metal layer into the three-layer structure are enhanced.

Furthermore, because the liquid crystal device has the first light shielding film 115, generation of undesirable photocurrent, which would occur if the light shielding performance of the first light shielding film 115 is not good enough, is further suppressed, and thus the obtained liquid crystal device can be advantageously used in an electronic device including a higher-intensity light source.

It is not necessary to form the metal layer M6. In the case where a light shielding film formed of two metal layers is provided on the pixel switching TFTs, it is desirable that the metal layer on the side facing the TFTs be formed of a material capable of absorbing light.

[Fifth Embodiment]

A fifth embodiment of the present invention is described below with reference to FIG. 7.

The present embodiment is different from the above-described third embodiment in that the first light shielding film 113 provided in the liquid crystal device shown in FIG. 5 is replaced with a first light shielding film 114 including, as shown in FIG. 7, a metal layer M3, a barrier layer B5 formed on a side, opposite to the TFT array substrate 10 (that is, on the upper side in FIG. 7), of the metal layer M3, and a barrier layer B4 formed on the side, closer to the TFT array substrate 10 (that is, on the lower side in FIG. 7), of the metal layer M3, wherein the barrier layer B5 is formed so as to extend into an area in direct contact with the TFT array substrate 10 such that the side faces of the barrier layer B4 and the side faces of the metal layer M3 are covered with the barrier layer B5.

Because the present embodiment is different from the third embodiment only in the first light shielding film as described above, FIG. 7 only shows the TFT array substrate and the first light shielding film and does not show, as in the third embodiment shown in FIG. 5, the other parts which are similar to those in the first embodiment.

In FIG. 7, reference numeral 10 denotes a TFT array substrate. On the TFT array substrate 10, there is provided the first light shielding film 114 that includes the barrier layer B4, the metal layer M3 formed on the barrier layer B4, and the barrier layer B5 formed on the metal layer M3 so as to extend into the area in direct contact with the TFT array substrate 10 such that the side faces of the barrier layer B4 and the side faces of the metal layer M3 are covered with the barrier layer B5.

The barrier layers B4 and B5 and the metal layer M3 of the first light shielding film 114 may be formed of similar materials with similar thicknesses to those of the barrier layers B3 and B4 and the metal layer M3 of the first light shielding film 113 according to the third embodiment described above.

A method of producing the liquid crystal device is described below. First, a TFT array substrate 10 made of a material such as quartz or hard glass is prepared. Thereafter, by sputtering, a barrier layer B4 is formed over the entire surface of the TFT array substrate 10 and then a metal layer M3 is formed thereon. Thereafter, by photolithography, a resist mask having a pattern corresponding to the first light shielding film 114 is formed, and the metal layer M3 and the barrier layer B4 are etched via the resist mask. Thereafter, the barrier layer B5 is formed by sputtering such that the metal layer M3 and the barrier layer B4 are covered with the barrier layer B5. More specifically, the barrier layer B5 is formed on the metal layer M3 so as to extend into the area in direct contact with the TFT array substrate 10 such that the side faces of the barrier layer B4 and the side faces of the metal layer M3 are covered with the barrier layer B5. Thereafter, unnecessary parts of the part the barrier layer B5 extending in the area in direction contact with the TFT array substrate 10 are etched by photolithography so as to form the first light shielding film 114 shown in FIG. 7. Thereafter, the remaining process required to obtain a complete TFT array substrate 10 is performed in a similar manner to the first embodiment. Furthermore, an opposite substrate 20 is formed in a similar manner to the first embodiment and adhesively bonded to the TFT array substrate 10 to construct a liquid crystal device.

In the first light shielding film 114 of the liquid crystal device, because the metal layer M3 is sandwiched between the two barrier layers B4 and B5, it is ensured, as in the third embodiment, that no significant degradation occurs in the ability of the first light shielding film 114 to block light during the high-temperate treatment performed after forming the first light shielding film 114.

Furthermore, because the barrier layer B5 is formed on the metal layer M3 so as to extend into the area in direct contact with the TFT array substrate 10 such that the side faces of the barrier layer B4 and the side faces of the metal layer M3 are covered with the barrier layer B5, the barrier layer B5 more effectively suppresses oxidation of the side faces of the metal layer M3 during the high-temperature heat treatment performed after the formation of the first light shielding film 114, and thus a reduction in the light shielding ability caused by oxidation of the material of the metal layer M3 is prevented in a more effective manner, and it is ensured that the first light shielding film 114 has high light shielding performance.

Furthermore, because the liquid crystal device has the first light shielding film 114, generation of undesirable photocurrent, which would occur if the light shielding performance of the first light shielding film 114 is not good enough, is further suppressed and thus the obtained liquid crystal device can be advantageously used in an electronic device including a higher-intensity light source.

In the present invention, the light shielding film may be formed such that the metal layer M3 and the barrier layer B4 are disposed between the barrier layer B5 and the TFT array substrate 10, as in the fifth embodiment described above. However, alternatively, the metal layer M3 and the barrier layer B4 shown in FIG. 7 may be replaced with, for example, one of the first light shielding films 111, 112, 113, and 114 according to the first to fourth embodiments.

In this case, the first light shielding film 111, 112, 113, or 114 and the side faces thereof are covered with the barrier layer B5, and thus the degradation in the light shielding ability caused by oxidation of the material of the metal layer can be prevented in a more effective fashion, and thus it is ensured that the first light shielding film has higher light shielding performance.

Although the light shielding film according to the present invention is advantageously used as the first light shielding film in the liquid crystal device in the embodiments described above, the light shielding film according to the present invention may also be used as a second light shielding film.

The light shielding layer described in the first to fifth embodiments may be formed in a proper layer above the pixel switching TFTs. For example, the light shielding layer may be formed in a layer between the pixel switching TFTs and the data lines.

The light shielding layer connected to the fixed potential may be connected to either the barrier layer or the metal layer.

(Electronic Device)

Figure 10:
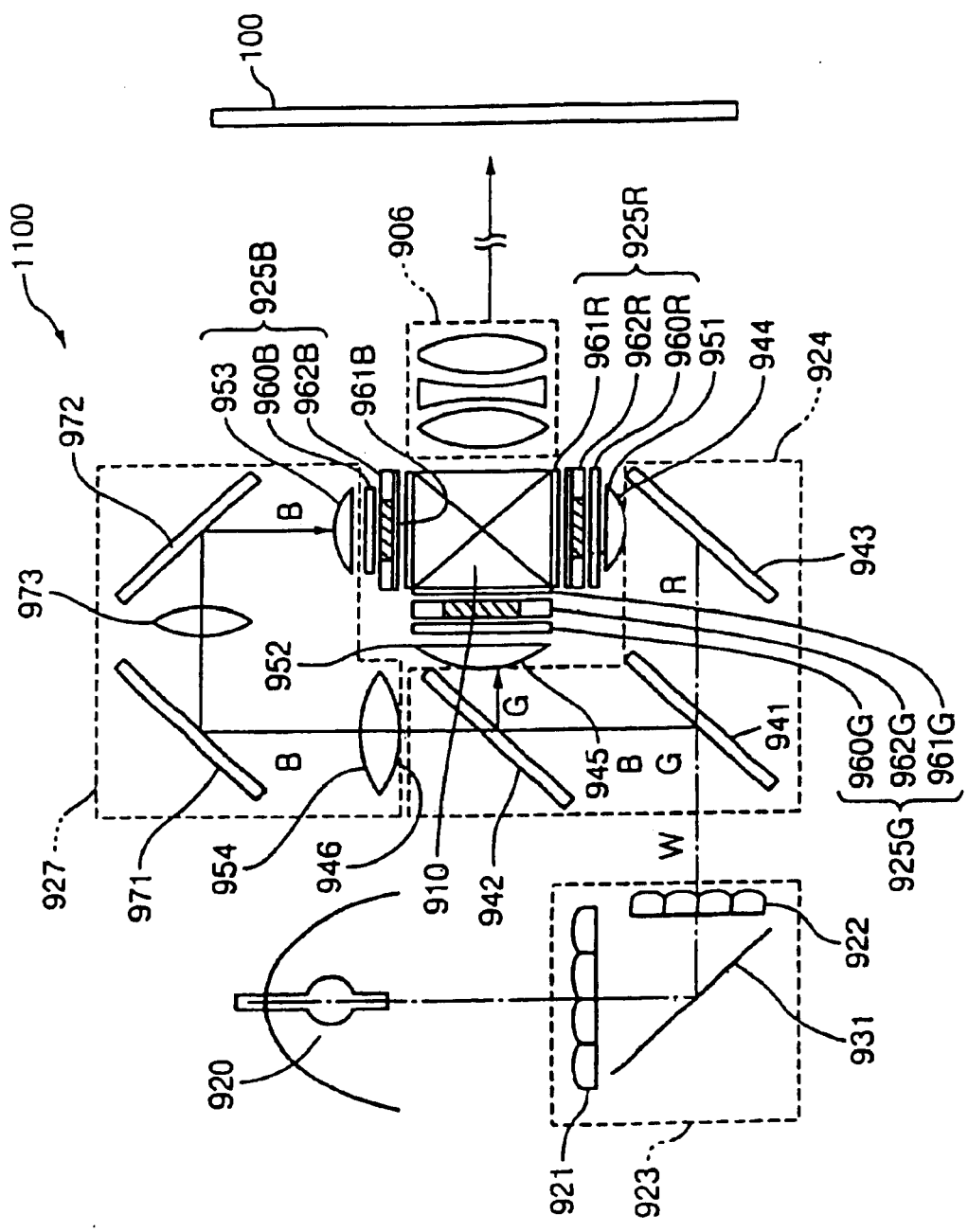
FIG. 10 is a schematic diagram of a projection type display device which is an example of an electronic device using a liquid crystal device.

As an example of an electronic device using the liquid crystal device according to one of the above-described embodiments, a projection type display device is described below with reference to FIG. 10. As shown schematically in FIG. 10, the projection type display device 1100 includes three liquid crystal devices 962R, 962G, and 962B obtained according to one of the embodiments described above. An optical system is formed by the liquid crystal devices 962R, 962G, and 962B serving as R, G, and B liquid crystal devices, respectively. The optical system of the projection type display device of the present embodiment also includes a light source 920 and an uniform-illumination optical system 923. The projection type display device also includes a color separation optical system 924 serving as a color separation device that separates a light ray W emerging from the uniform-illumination optical system 923 into light rays of red (R), green (G), and blue (B); three light valves 925R, 925G, and 925B serving as modulation devices that modulate the respective light rays R, G, and B; a color mixing prism 910 serving as a color mixing device that mixes the modulated color light rays, and a projection lens unit 906 serving as a projection device that projects the mixed light ray onto the surface of a projection screen 100 so as to form an enlarged image. The projection type display device also includes a light guiding system 927 that guides the blue light ray B to the light valve 925B.

The uniform-illumination optical system 923 includes two lens plates 921 and 922 and a reflective mirror 931. The two lens plates 921 and 922 are disposed such that they are oriented in directions perpendicular to each other, and the reflective mirror 931 is disposed between the two lens plates 921 and 922. Each of the two lens plates 921 and 922 of the uniform-illumination optical system 923 includes a plurality of rectangular lenses arranged in the form of a matrix. The light ray emitted from the light source 920 is divided by the rectangular lenses of the first lens plate 921 into a plurality of sub light rays. The sub light rays are then superimposed near the three light valves 925R, 925G, and 925B by the rectangular lenses of the second lens plate 922. Thus, use of the uniform-illumination optical system 923 makes it possible to uniformly illuminate the three light valves 925R, 925G, and 925B with illumination light even when the light ray emitted from the light source 920 is not uniform in intensity distribution in cross section.

The color separation optical system 924 includes a blue/green reflective dichroic mirror 941, a green reflective dichroic mirror 942, and a reflective mirror 943. First, a blue light ray B and a green light ray G contained in the light ray W are reflected by the blue/green reflective dichroic mirror 941 at a right angle and travel toward the green reflective dichroic mirror 942. A red light ray R is passed through the mirror 941 and is reflected by the reflective mirror 943 located behind the mirror 941 at a right angle and is output toward the prism unit 910 via an output element 944 that outputs the red light ray R.

On the other hand, of the blue light ray B and the green light ray G reflected by the blue/green reflective dichroic mirror 941, only the green light ray G is reflected by the green reflective dichroic mirror 942 at a right angle and is output toward the color mixing system via an output element 945 for outputting the green light ray G. The blue light ray B is passed through the green reflective dichroic mirror 942 and is output toward the light-guiding system 927 via an output element 946 for outputting the blue light ray B. In this specific embodiment, the color separation optical system 924 is formed such that the distances from the output element for outputting the light ray W from the uniform-illumination optical element to the respective output elements 944, 945, and 946 that output the respective color light rays become substantially equal.

In the color separation optical system 924, condenser lenses 951 and 952 are disposed on the output sides of the respective output elements 944 and 945 that output the red light ray R and the green light ray G, respectively. Thus, the red and green light rays R and G output via the corresponding output elements are collimated through the condenser lenses 951 and 952, respectively.

The collimated red and green light rays R and G are then incident upon the light valves 925R and 925G, respectively, and modulated thereby. As a result, image information is added to the respective color light rays. That is, these liquid crystal devices are controlled by a driving device (not shown), such that they are switched in accordance with the image information thereby modulating the respective color light rays passing therethrough. On the other hand, the blue light ray B is transmitted to the light valve 925B via the light-guiding system 927 and is modulated by the light valve 925B in accordance with the image information. In the present embodiment, the light valves 925R, 925G, and 925B respectively include input polarization means 960R, 960G, and 960B, output polarization means 961R, 961G, and 961B, and liquid crystal devices 962R, 962G, and 962B disposed between the corresponding input polarization device and output polarization device.

The light-guiding system 927 includes a condenser lens 954 disposed on the output side of the output element 946 that outputs the blue light ray B, an input reflective mirror 971, an output reflective mirror 972, an intermediate lens 973 disposed between these reflective mirrors, and a condenser lens 953 disposed in front of the light valve 925B. The blue light ray B output via the condenser lens 946 is guided to the liquid crystal device 962B via the light-guiding system 927 and is modulated thereby. Of the lengths of the optical paths of the respective color light rays, that is, of the distances from the output element for outputting the light ray W to the respective liquid crystal devices 962R, 962G, and 962B, the optical path of the blue light ray B is the longest, and thus the blue light ray encounters the greatest transmission loss. The use of the light-guiding system 927 minimizes the transmission loss of light.

After being modulated by the light valves 925R, 925G, 925B, the respective color light rays R, G, and B are incident upon the color mixing prism 910 and mixed together thereby. The resultant mixed light output from the color mixing prism 910 is projected via the projection lens unit 906 onto the surface of the projection screen 100 disposed at a predetermined location thereby forming an enlarged image on the screen.

In the present embodiment, because each of the liquid crystal devices 962R, 962G, and 962B has a light shielding film disposed under TFTs, the channels of the TFTs that switch the pixel electrodes are sufficiently protected from illumination of light, even if projection light from the liquid crystal devices 962R, 962G, 962B is reflected in the projection optical system in the liquid crystal projection, or if light is reflected from the surface of the TFT array substrate when the projection light passed therethrough, or if projection light emitted from other liquid crystal devices partially leaks from the projection optical system and is incident as returning light upon the TFT array substrate. This makes it possible for the electronic device to use a high-intensity light source without causing generation of an undesirable photocurrent.

Furthermore, when a small-sized prism unit is employed in the projection optical system, it is unnecessary to provide an additional film for shielding the returning light at locations between the prism unit and the respective liquid crystal devices 962R, 962G, and 962B and it is unnecessary to perform a return light prevention process upon the polarization device. This feature is very useful to achieve a small-sized and simplified structure.

In the present embodiment, because the effects of return light upon the channel regions of TFTs are suppressed, it is unnecessary that the polarizing device 961R, 961G, and 961B subjected to return light prevention processing be bonded directly to the corresponding liquid crystal devices. This makes it possible to dispose the polarizing device at locations apart from the liquid crystal devices. More specifically, it becomes possible to adhesively bond the polarizing device 961R, 961G, and 961B to the prism unit 910 and to adhesively bond the other polarizing means 960R, 960G, and 960B to the respective condenser lenses 953, 945, and 944. The adhesive bonding of the polarizing device to the prism unit or the condenser lenses makes it possible for heat in the polarizing device to be absorbed by the prism unit or the condenser lenses, and thus an increase in temperature of the liquid crystal devices is prevented.

Although not shown in the figures, if the liquid crystal devices are disposed apart from the polarizing device, air layers are created between the liquid crystal devices and the polarizing device, and thus it is possible to prevent an increase in the temperature of the liquid crystal devices in a more effective manner by sending cooling air in the spaces between the liquid crystal devices and the polarizing device using a cooling device, thereby preventing malfunctioning due to the increase in the temperature of the liquid crystal devices.

[Evaluations]

Results of evaluations of the present invention are described in detail below with reference with specific examples.

[Evaluation 1: Relationship Between the Film Thickness of the Barrier Layer and the Transmittance]

Figure 11:
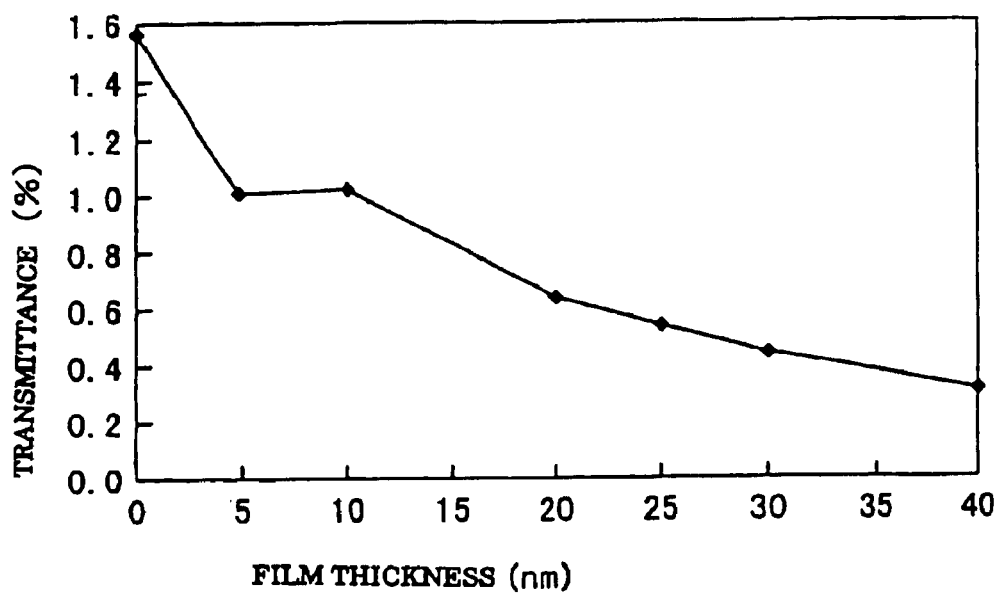
FIG. 11 is a graph illustrating the relationship between the film thickness and the transmittance of a barrier layer.

FIG. 11 shows the result of evaluation.

In this evaluation, a light shielding film that includes a lower barrier layer formed of WSi, a metal layer formed of Ti, and an upper barrier layer formed of WSi was disposed on an insulating substrate, and an insulating layer was then formed on the light shielding film. The thickness of the upper barrier layer was fixed at 25 nm and the thickness of the metal layer was fixed at 50 nm. On the other hand, the thickness of the lower barrier layer was varied in the range from 0 to 40 nm, and the obtained samples were evaluated. The evaluation was performed by measuring the transmittance (Y value at 550 nm) after annealing the insulating layer at 1020° C. and plotting the transmittance (Y value at 550 nm) as a function of the thickness of the lower barrier layer.

When the thickness of the lower barrier layer was 0 nm, the metal layer was oxidized through a reaction between the metal layer and the insulating substrate, and thus an oxide film was formed on the metal layer. In this case, the measured transmittance was 1.6%.

When the thickness of the lower barrier layer was set to 5 nm, the measured transmittance was 1.0%, and transmittance as low as 0.6% was obtained for the samples in which the thickness of the lower barrier layer was set to 25 nm. When the thickness of the lower barrier layer is set to, for example, 3 nm, the total thickness of the light shielding film becomes 78 nm. Even when the thickness of the lower barrier layer is set to 40 nm, the total thickness is as small as 115 nm, which is much thinner than required for the light shielding film formed of WSi. This results in a small difference in surface level created by steps in the alignment film on the TFT array substrate. It has been experimentally confirmed that the small difference in surface level allows a reduction in alignment failures of the liquid crystal.

[Evaluation 2: Relationship Between the Transmittance and the Film Thickness of the Metal Layer in the Structure According to the First Embodiment]

Figure 12:
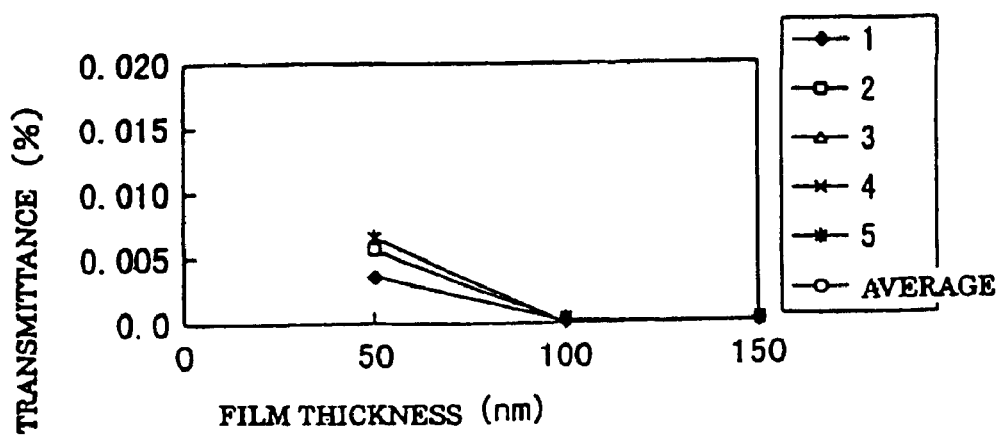
FIG. 12 is a graph illustrating the relationship between the film thickness and the transmittance of a metal layer.

FIG. 12 shows the result of evaluation.

In this evaluation, a light shielding film that includes a metal layer Ti and a barrier layer of WSi was formed on an insulating substrate, and an insulating layer was then formed on the light shielding film. The thickness of the metal layer was varied in the range from 50 to 150 nm such that the total thickness of the light shielding film became equal to 200 nm, and the obtained samples were evaluated. The evaluation was performed by measuring the transmittance (Y value at 550 nm) after annealing the insulating layer at 680° C. and plotting the measured transmittance (Y value at 550 nm) as a function of the thickness of the metal layer. Measurement of the transmittance was performed at five points on the surface of each sample, and mean values thereof were calculated.

Although in this structure, the barrier layer was only formed on the surface, in contact with the insulating film which was subjected to the high-temperature heat treatment, of the metal layer, very small transmittance, such as about 0.005%, was obtained for the sample in which the thickness of the metal layer was set to 50 nm. That is, excellent light shielding capability was achieved. When the thickness of the metal layer was set to be greater than 100 nm, the transmittance substantially equal to zero was obtained.

[Evaluation 3: Relationship Between the Transmittance and the Film Thickness of the Metal Layer in the Structure According to the Second Embodiment]

Figure 13:
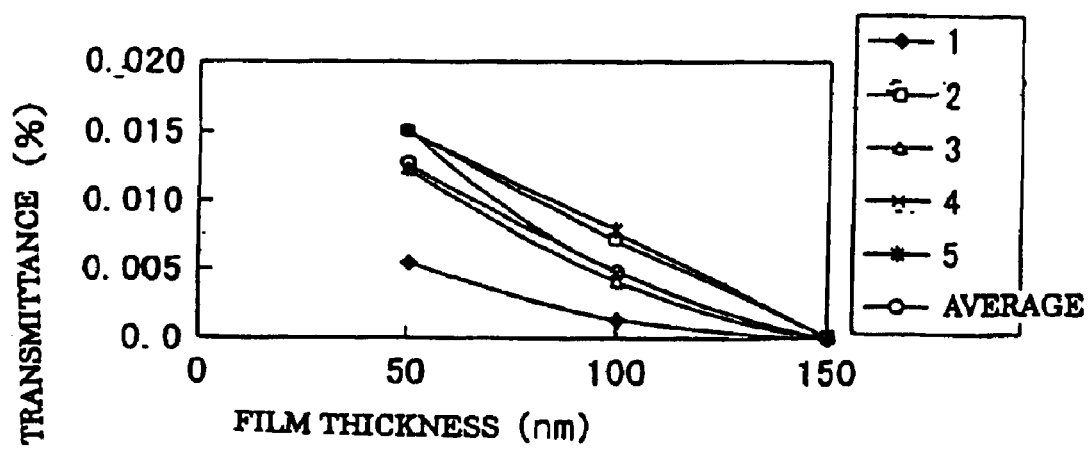
FIG. 13 is a graph illustrating the relationship between the film thickness and the transmittance of a metal layer.

FIG. 13 shows the result of evaluation.

In this evaluation, a light shielding film that includes a barrier layer of WSi and a metal layer of Ti was formed on an insulating substrate, and an insulating layer was formed on the light shielding film. The thickness of the metal layer was varied in the range from 50 to 150 nm such that the total thickness of the light shielding film became equal to 200 nm, and the obtained samples were evaluated. The evaluation was performed by measuring the transmittance (Y value at 550 nm) after annealing the insulating layer at 680° C. and plotting the measured transmittance (Y value at 550 nm) as a function of the thickness of the metal layer. Measurement of the transmittance was performed at five points on the surface of each sample, and mean values thereof were calculated.

Although in this structure, the barrier layer was only formed on the surface, in contact with the insulating substrate, of the metal layer, very small transmittance such as about 0.015% was obtained for the sample in which the thickness of the metal layer was set to 50 nm. That is, excellent light shielding capability was achieved compared with the light shielding film formed of 200 nm thick WSi. When the thickness of the metal layer was set to 150 nm, the transmittance substantially equal to zero was obtained.

[Evaluation 4: Relationship Between the Transmittance and the Film Thickness of the Metal Layer in the Structure According to the Third Embodiment]

Figure 14:
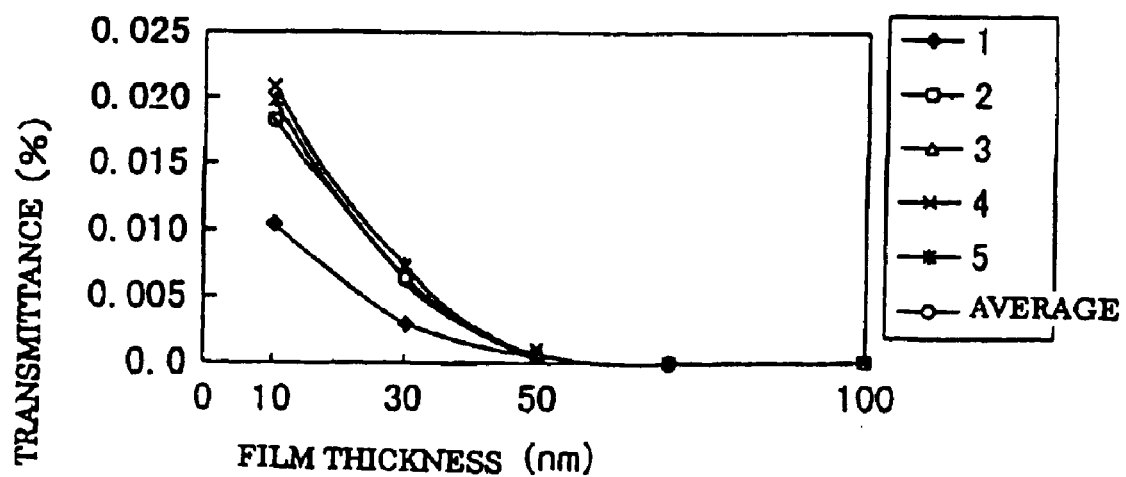
FIG. 14 is a graph illustrating the relationship between the film thickness and the transmittance of a metal layer.
Figure 15:
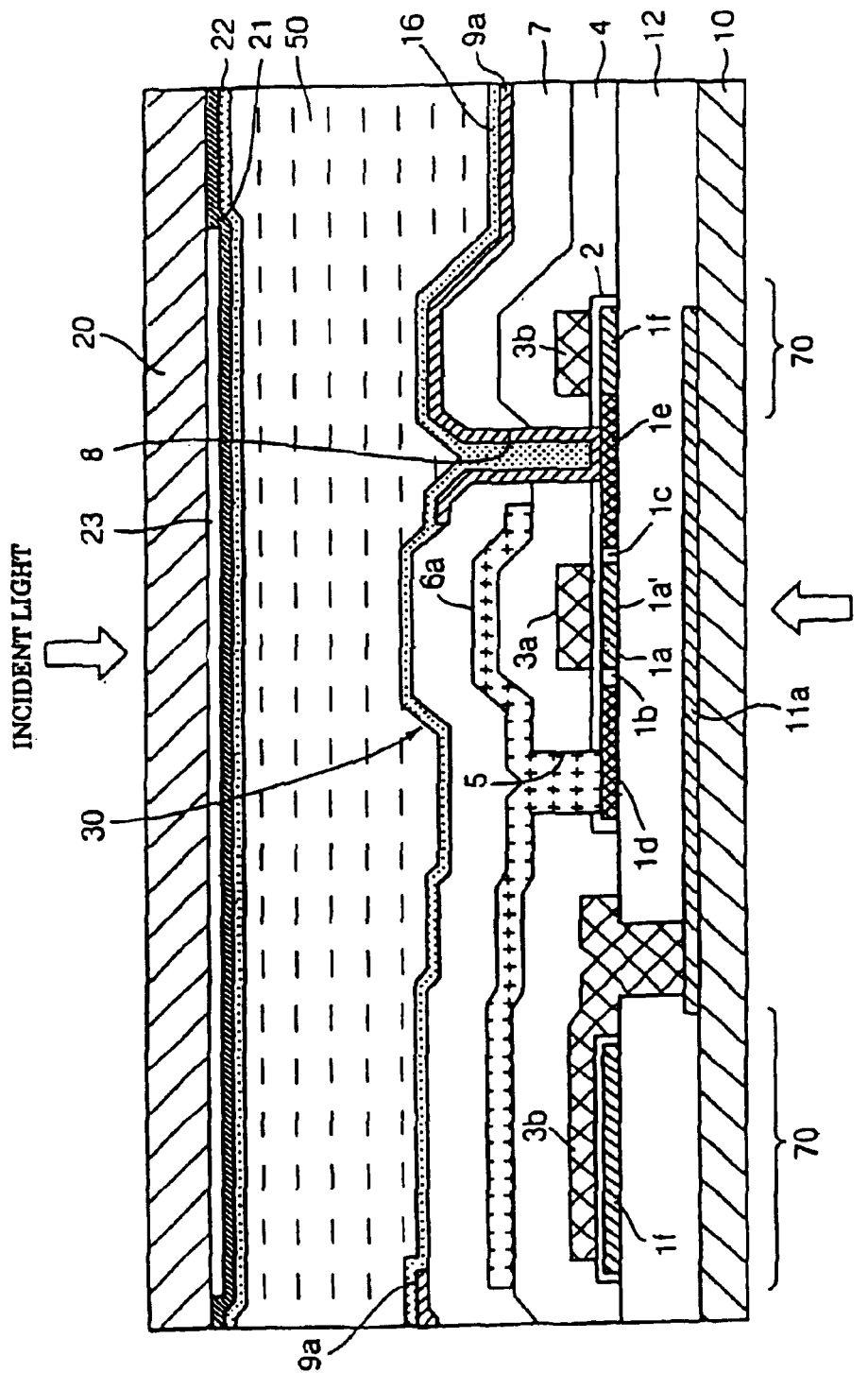
FIG. 15 is a diagram illustrating a cross-sectional structure of a pixel of a conventional liquid crystal device.

FIG. 14 shows the result of evaluation.

In this evaluation, a light shielding film that includes a lower barrier layer of WSi, a metal layer of Ti, and an upper barrier layer of WSi was formed on an insulating substrate, and an insulating layer was formed on the light shielding film. The thickness of the upper barrier layer and the thickness of the lower barrier layer were fixed at 50 nm, and the thickness of the metal layer was varied in the range from 10 to 100 nm. The obtained samples were evaluated by measuring the transmittance (Y value at 550 nm) after annealing the insulating layer at 680° C. and plotting the measured transmittance (Y value at 550 nm) as a function of the thickness of the lower barrier layer. Measurement of the transmittance was performed at five points on the surface of each sample, and mean values thereof were calculated.

Very small transmittance such as about 0.020% was obtained for the sample in which the thickness of the metal layer was set to 10 nm. When the thickness of the metal layer was set to be greater than 50 nm, the transmittance became substantially equal to zero. That is, excellent light shielding performance was achieved.

The evaluations have revealed that the light shielding film according to the present invention has better light shielding capability than the light shielding film formed of WSi. The evaluations have also revealed that the thickness of the light shielding film can be reduced and thus it is possible to reduce the amount of bending of the insulating film caused by the presence of the light shielding film.

In the light shielding film according to the present invention, as described above, even if a high-temperature heat treatment is performed after forming the light shielding film, the barrier layer, which is formed of a refractory metal or a refractory metal compound containing no oxygen on the surface in contact with the insulating film containing oxygen such as SiO2, suppresses oxidation of the metal layer of the light shielding film, and thus allowing the light shielding film to maintain good light shielding performance.

In particular, when such a light shielding film is provided on a substrate for use in an electro-optical device or provided in an electro-optical device, pixel switching elements are prevented from encountering generation of an undesirable photocurrent. Furthermore, the difference in surface level caused by the presence of the light shielding film can be minimized, and thus it is possible to provide a substrate for use in an electro-optical device and an electro-optical device capable of displaying a high-quality image.

What is claimed is:

1. An electro-optical apparatus, comprising:
   a pair of substrates;
   an electro-optical material disposed between the pair of substrates;
   a switching element disposed on one of said substrates; and
   a light shielding film disposed at a location that opposes said switching element, and that is on said one of said substrates, said light shielding film including:
   a metal layer formed of a refractory metal in the form of a simple substance or a refractory metal compound; and
   barrier layers disposed on at least one surface of said metal layer, such that side faces of a lower barrier layer and side faces of the metal layer are covered with an upper barrier layer, said barrier layers being formed of a refractory metal or a refractory metal compound containing no oxygen.

2. The electro-optical apparatus according to claim 1, the metal layer of said light shielding film including a light shielding metal and a light-absorbable metal layer.

3. The electro-optical apparatus according to claim 1, said light shielding film being connected to a fixed potential.

4. The electro-optical apparatus according to claim 1, said light barriers layer being formed of a material selected from the group including a nitride compound, a silicon compound, a tungsten compound, tungsten, and silicon.

5. The electro-optical apparatus according to claim 1, said barrier layers being formed of WSi.

6. The electro-optical apparatus according to claim 5, said metal layer being formed of Ti.

7. The electro-optical apparatus according to claim 1, said barrier layers being formed of tungsten.

8. The electro-optical apparatus according to claim 1, further comprising:
   a barrier layer formed by depositing a film of a refractory metal or a refractory metal compound containing no oxygen prior to forming the metal layer.

9. The electro-optical apparatus according to claim 1, including an insulating film formed by depositing an insulating material on said barrier layer, said forming the insulating film including performing heat treatment at a temperature in the range from 500° C. to 1100° C.

10. An electro-optical apparatus, comprising:
    a pair of substrates;
    an electro-optical material disposed between the pair of substrates;
    a switching element disposed above one of the substrates;
    a light shielding film disposed at a location opposing the switching element; and
    an insulating film between the light shielding film and the switching element, the light shielding film including:
    a metal layer formed of a refractory metal in the form of a simple substance or a refractory metal compound; and
    barrier layers disposed on upper and lower surfaces of the metal layer, the barrier layers being formed of a refractory metal or a refractory metal compound containing no oxygen, the thickness of the barrier layer formed on the upper surface of the metal layer being greater than a thickness of the barrier layer formed on the lower surface of the metal layer.

* * * * *